(12) United States Patent
Kamiya

(10) Patent No.: US 7,768,553 B2
(45) Date of Patent: Aug. 3, 2010

(54) PHOTOGRAPHING APPARATUS, DISPLAY CONTROL METHOD, AND PROGRAM

(75) Inventor: Mayumi Kamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 810 days.

(21) Appl. No.: 11/556,329

(22) Filed: Nov. 3, 2006

(65) Prior Publication Data

US 2007/0115368 A1 May 24, 2007

(30) Foreign Application Priority Data

Nov. 18, 2005 (JP) .......................... P2005-333703

(51) Int. Cl.
*H04N 5/225* (2006.01)
*H04N 5/222* (2006.01)
(52) U.S. Cl. ............................... 348/220.1; 348/333.01
(58) Field of Classification Search ............. 348/220.1, 348/222.1, 333.01, 333.02, 333.11, 333.13, 348/333.1; 386/106, 121, 125, 107–117; 358/906, 121
See application file for complete search history.

(56) References Cited

U.S. PATENT DOCUMENTS

| | | | | |
|---|---|---|---|---|
| 5,905,528 | A * | 5/1999 | Kodama | 348/220.1 |
| 7,215,371 | B2 * | 5/2007 | Fellegara et al. | 348/333.13 |
| 7,257,317 | B2 * | 8/2007 | Ohnishi | 386/120 |
| 7,489,348 | B2 * | 2/2009 | Okada et al. | 348/231.2 |
| 2001/0000969 | A1 * | 5/2001 | Ohta et al. | 348/231 |
| 2002/0012051 | A1 * | 1/2002 | Mizoguchi | 348/220 |
| 2004/0109676 | A1 * | 6/2004 | Seo et al. | 386/95 |
| 2005/0146623 | A1 * | 7/2005 | Juen | 348/220.1 |
| 2006/0038908 | A1 * | 2/2006 | Yoshino | 348/333.11 |
| 2006/0152599 | A1 * | 7/2006 | Yokonuma et al. | 348/231.99 |

FOREIGN PATENT DOCUMENTS

| | | |
|---|---|---|
| JP | 2001-211408 | 8/2001 |
| JP | 2001-320608 | 11/2001 |
| JP | 2002-44531 | 2/2002 |
| JP | 2005-051810 | 2/2005 |
| JP | 2005-079814 | 3/2005 |
| JP | 2005-229190 | 8/2005 |

* cited by examiner

*Primary Examiner*—Nhan T Tran
*Assistant Examiner*—Trung Diep
(74) *Attorney, Agent, or Firm*—Oblon, Spivak, McClelland, Maier & Neustadt, L.L.P.

(57) ABSTRACT

In a photographing apparatus, image data obtained when an instruction for capturing a still image is issued during capturing of a moving picture is saved in a first recording medium, and a still image is generated based on the image data saved in the first recording medium and is recorded on a second recording medium different from the first recording medium when the capturing of the moving picture has been completed. The photographing apparatus includes a display control unit configured to display, during the capturing of the moving picture, a first icon indicating the second recording medium as a still-image recording destination and an indicator indicating the number of still images for which image data can be saved in the first recording medium, and to display an indicator indicating that the still image is recorded on the second recording medium when the capturing of the moving picture has been completed.

7 Claims, 17 Drawing Sheets

FIG. 5
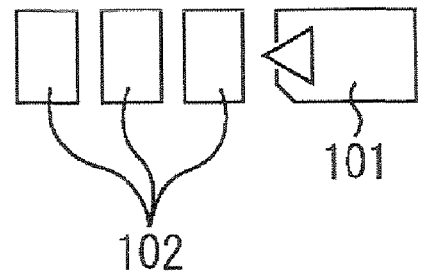
FIG. 6
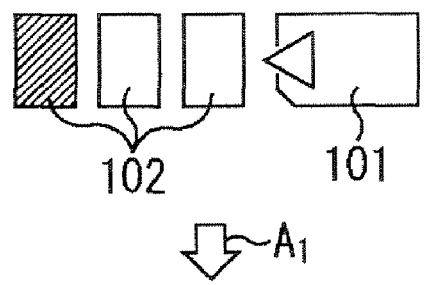
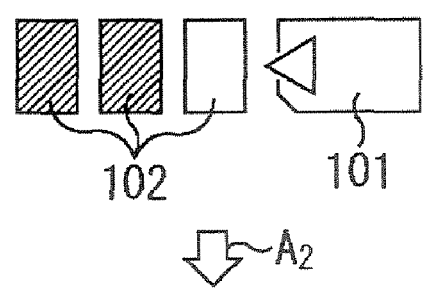
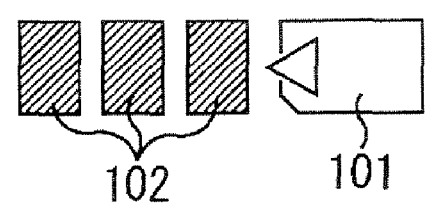

PHOTOGRAPHING APPARATUS, DISPLAY CONTROL METHOD, AND PROGRAM

CROSS REFERENCES TO RELATED APPLICATIONS

The present invention contains subject matter related to Japanese Patent Application JP 2005-333703 filed in the Japanese Patent Office on Nov. 18, 2005, the entire contents of which are incorporated herein by reference.

BACKGROUND OF THE INVENTION

1. Field of the Invention

The present invention relates to photographing apparatuses, display control methods, and programs. More specifically, the present invention relates to a photographing apparatus, a display control method, and a program that allow a user to intuitively understand that image data for generating a still image is saved and that the still image is recorded on the basis of the saved image data.

2. Description of the Related Art

Many of recent commercially available video cameras permit still image shooting as well as moving picture shooting. Even during capturing of moving pictures, users can capture still images using the same video cameras as those with which the users are currently capturing the moving pictures without using digital still cameras.

Due to the limited reading speed of image pickup devices, video cameras can only record a still image by capturing, from among images picked up to record a moving picture, one frame picked up at a timing when an instruction for capturing a still image is issued. Although video cameras can store still images, the quality of the images is not good. In general, in order to record moving pictures with high quality, an operation defined by moving-picture processing parameters is performed on picked up signals (data). In order to record still images with high quality, high resolution is maintained, and an operation defined by still-image processing parameters is performed on picked up signals (data).

Various techniques for allowing still image shooting and moving picture shooting at the same time while attaining high-resolution still images have been proposed. For example, Japanese Unexamined Patent Application Publication No. 2002-44531 discloses a technique in which an image pickup signal with higher resolution than the moving picture resolution is output every N times for a period during which a moving picture is captured, where $N \geqq 2$, thereby achieving the objects described above.

SUMMARY OF THE INVENTION

In the technique disclosed in the above-mentioned publication, however, a high-resolution still image is not obtained for the other N−1 frame periods during which the image pickup signal with high resolution is not output. There is a demand for techniques capable of obtaining a high-resolution still image at any timing during capturing of a moving picture.

In one technique, for example, original image data that is obtained when an instruction for capturing a still image is issued during capturing of a moving picture but has not yet been subjected to moving-picture processing is temporarily saved in a memory, and a still image is generated based on the original image data saved in the memory and is recorded on a memory card or the like when the capturing of the moving picture has been completed. In this technique, a still image is not recorded immediately after the instruction for capturing a still image is given by a user. Thus, when the instruction for capturing a still image is given by the user, it is necessary to inform the user that the still image will be recorded later. That is, there is a time lag between the timing when the user gives an instruction to capture a still image and the timing when the still image is actually recorded on a memory card. Thus, the user may be nervous about whether the operation is correctly performed.

Further, the capacity of a memory in which the original image data is temporarily stored is generally limited, and it is also necessary to inform the user of available capacity.

If no countermeasure is taken, even though many still images are captured during capturing of a moving picture, actually, a smaller number of still images than the number of times of capturing, the number of which is the same as the number of still images for which the image data can be saved, may be recorded on a memory card. In a case where still images can be captured up to the full capacity of the memory card unless capturing of a moving picture is in progress, the number of still images that can be captured is limited only when the capturing of the moving picture is in progress, which may confuse users.

It is therefore desirable to allow a user to intuitively understand that image data for generating a still image is saved and that the still image is recorded on the basis of the saved image data.

According to an embodiment of the present invention, there is provided a photographing apparatus for capturing a still image during capturing of a moving picture, in which image data obtained when an instruction for capturing a still image is issued during capturing of a moving picture is saved in a first recording medium, and a still image is generated based on the image data saved in the first recording medium and is recorded on a second recording medium different from the first recording medium when the capturing of the moving picture has been completed, the photographing apparatus including display control means for displaying a first icon and an indicator side-by-side during the capturing of the moving picture, the first icon indicating the second recording medium that is a recording destination of the still image and the indicator indicating the number of still images for which image data can be saved in the first recording medium, and for displaying an indicator indicating that the still image generated based on the image data saved in the first recording medium is currently recorded on the second recording medium when the capturing of the moving picture has been completed.

The indicator indicating the number of still images for which image data can be saved in the first recording medium may include at least one second icon, the number of which corresponds to the number of still images; and the display control means may display the second icon in a different color each time the image data is saved in the first recording medium in response to the instruction for capturing a still image.

For a period during which the still image generated based on the image data saved in the first recording medium is recorded on the second recording medium, the display control means may further display the generated still image.

For a period during which a plurality of still images generated based on the image data saved in the first recording medium are recorded on the second recording medium, the display control means may sequentially display the generated still images.

According to another embodiment of the present invention, there is provided a display control method for a photographing apparatus for capturing a still image during capturing of a moving picture, in which image data obtained when an instruction for capturing a still image is issued during capturing of a moving picture is saved in a first recording medium, and a still image is generated based on the image data saved in the first recording medium and is recorded on a second recording medium different from the first recording medium when the capturing of the moving picture has been completed, or a program for allowing a computer to execute the display control method, the display control method or the program including the steps of displaying a first icon and an indicator side-by-side during the capturing of the moving picture, the first icon indicating the second recording medium that is a recording destination of the still image and the indicator indicating the number of still images for which image data can be saved in the first recording medium; and displaying an indicator indicating that the still image generated based on the image data saved in the first recording medium is currently recorded on the second recording medium when the capturing of the moving picture has been completed.

In an embodiment of the present invention, an icon indicating a second recording medium serving as a recording destination of still images and an indicator indicating the number of still images for which image data can be saved in a first recording medium are displayed side-by-side during capturing of a moving picture; and an indicator indicating that a still image generated based on image data saved in the first recording medium is currently recorded on the second recording medium when the capturing of the moving picture has been completed.

According to an embodiment of the present invention, therefore, a user can intuitively understand that image data for generating a still image is saved and that the still image is recorded on the basis of the saved image data.

BRIEF DESCRIPTION OF THE DRAWINGS

FIG. 5 is a diagram showing example icons;

FIG. 6 is a diagram showing an example of the display transitions of the icons;

DESCRIPTION OF THE PREFERRED EMBODIMENTS

Figure 1:
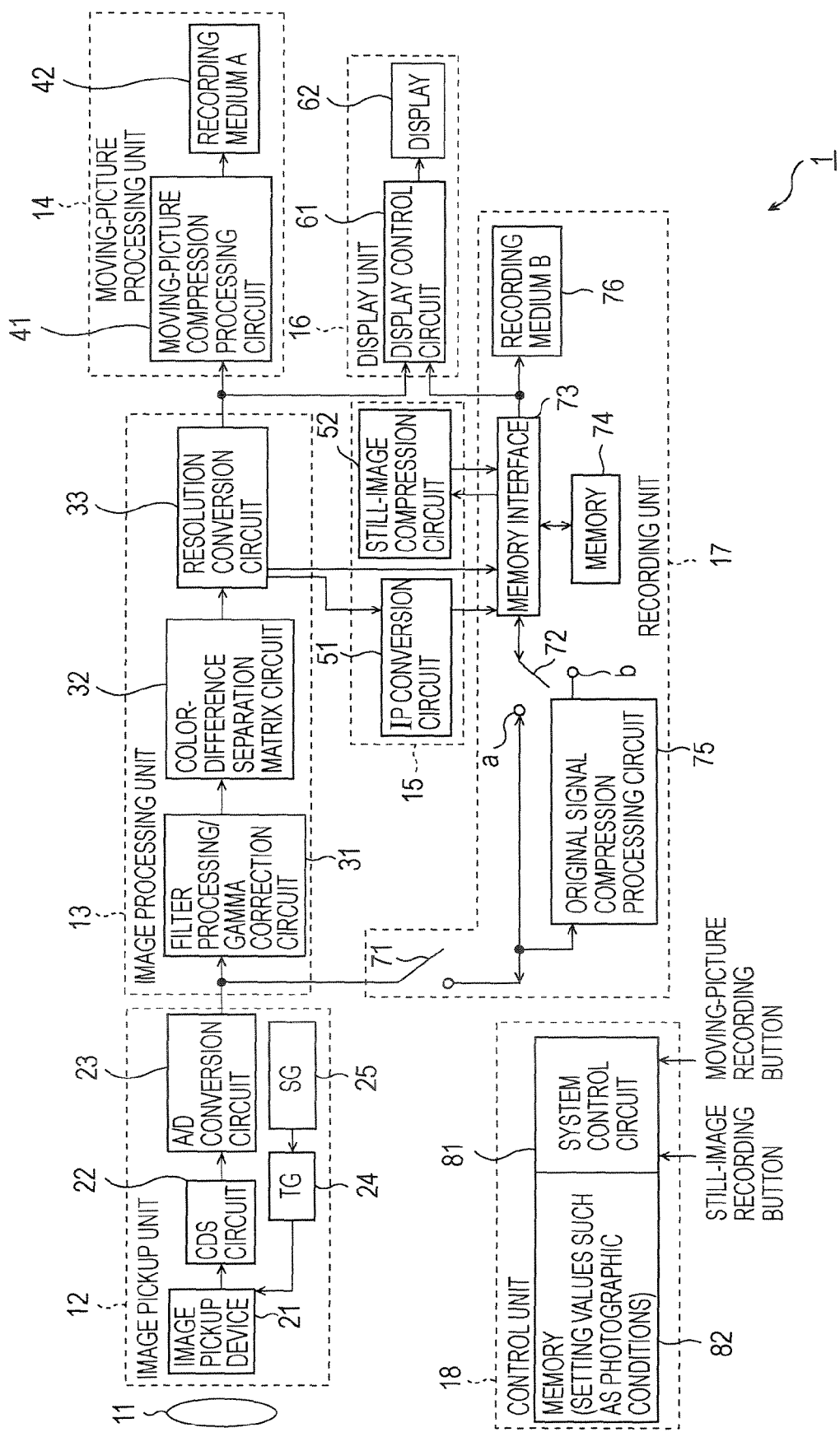
FIG. 1 is a block diagram showing an example structure of a photographing apparatus according to an embodiment of the present invention.

Before describing an embodiment of the present invention, the correspondence between the features of the claims and the specific elements disclosed in an embodiment of the present invention described with reference to the specification or the drawings is discussed below. This description is intended to assure that an embodiment supporting the claimed invention is described in this specification or the drawings. Thus, even if an element in the following embodiment is not described as relating to a certain feature of the present invention in the specification or the drawings, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, there is provided a photographing apparatus (e.g., a photographing apparatus 1 shown in FIG. 1) for capturing a still image during capturing of a moving picture, in which image data obtained when an instruction for capturing a still image is issued during capturing of a moving picture is saved in a first recording medium (e.g., a memory 74 shown in FIG. 1), and a still image is generated based on the image data saved in the first recording medium and is recorded on a second recording medium (e.g., a recording medium B shown in FIG. 1) different from the first recording medium when the capturing of the moving picture has been completed, the photographing apparatus including display control means (e.g., a display control circuit 61 shown in FIG. 1) for displaying a first icon (e.g., a recording-destination indicator icon 101 shown in FIG. 5) and an indicator (e.g., a number-of-available-shots indicator icon 102 shown in FIG. 5) side-by-side during the capturing of the moving picture, the first icon indicating the second recording medium that is a recording destination of the still image and the indicator indicating the number of still images for which image data can be saved in the first recording medium, and for displaying an indicator (e.g., an indicator 103 shown in FIG. 7) indicating that the still image generated based on the image data saved in the first recording medium is currently recorded on the second recording medium when the capturing of the moving picture has been completed.

According to another embodiment of the present invention, there is provided a display control method for a photographing apparatus for capturing a still image during capturing of a moving picture, in which image data obtained when an instruction for capturing a still image is issued during capturing of a moving picture is saved in a first recording medium, and a still image is generated based on the image data saved in the first recording medium and is recorded on a second recording medium different from the first recording medium when the capturing of the moving picture has been completed, or a program for allowing a computer to execute the display control method, the display control method or the program including the steps of displaying (e.g., step S61 shown in FIG. 17) a first icon and an indicator side-by-side during the capturing of the moving picture, the first icon indicating the second recording medium that is a recording destination of the still image and the indicator indicating the number of still images for which image data can be saved in the first recording medium; and displaying an indicator indicating that the still image generated based on the image data saved in the first recording medium is currently recorded on the second recording medium when the capturing of the moving picture has been completed.

An embodiment of the present invention will be described with reference to the drawings.

FIG. 1 is a block diagram showing an example structure of a photographing apparatus 1 according to an embodiment of the present invention.

The photographing apparatus 1 includes a lens unit 11, an image pickup unit 12, an image processing unit 13, a moving-picture processing unit 14, a still-image processing unit 15, a display unit 16, a recording unit 17, and a control unit 18, and is configured to capture a moving picture and a still image. That is, the photographing apparatus 1 is not an apparatus having two circuit arrangements (image processing units), one adapted to record a moving picture and the other adapted to record a still image, but is an apparatus that performs signal processing for recording a moving picture and signal processing for recording a still image using a single arrangement, namely, the image processing unit 13.

For example, if an instruction for capturing a still image is issued during capturing of a moving picture, a signal obtained by the image pickup unit 12 when the instruction is issued is separated into two signals. One of the signals is subjected to moving-picture processing and is recorded while the other signal is temporarily recorded in a memory such as a random access memory (RAM) (after it is subjected to compression processing, if necessary, which is discussed below).

Thereafter, when an instruction for finishing the photographing operation is issued and the capturing of the moving picture is stopped, the temporarily recorded signal is supplied to the image processing unit 13 to perform still-image processing, and is recorded as one still image. The image processing unit 13 is configured to switch between processing parameters for moving-picture processing and still-image processing.

Accordingly, when an instruction for recording a still image is issued during capturing of a moving picture, a signal obtained by capturing the moving picture is saved so that the signal can also be used for still-image recording, and is subjected to still-image processing on the basis of the saved original signal in a period during which the moving-picture processing is not being performed, whereby image processing specific to moving pictures and image processing specific to still images can be performed using a single arrangement (i.e., the image processing unit 13). The photographing apparatus 1 using such a single arrangement can reduce the circuit scale compared with an apparatus with two arrangements including one for performing image processing specific to moving pictures and the other for performing image processing specific to still images. The power consumption can also be reduced. Furthermore, the cost can be reduced.

By shifting the timing of the image processing for recording a moving picture and the timing of the image processing for recording a still image, the signal used for moving-picture recording can be subjected to moving-picture processing while the signal used for still-image recording (that is, the temporarily saved signal) can be subjected to still-image processing. Therefore, the quality of the moving picture is not impaired, and a high-quality still image can be obtained while maintaining high quality of the moving picture.

A series of operations performed by the photographing apparatus 1 is described below with reference to flowcharts.

The lens unit 11 includes optical modules such as a lens for collecting light from an object, a focus lens for adjusting the lens focus, and an aperture diaphragm. Light from the object collected by the lens of the lens unit 11 enters an image pickup device 21 of the image pickup unit 12.

The image pickup unit 12 includes the image pickup device 21, a correlated double sampling (CDS) circuit 22, an analog/digital (A/D) conversion circuit 23, a timing generator (TG) 24, and a signal generator (SG) 25.

The image pickup device 21 performs progressive or interlaced scanning every $\frac{1}{60}$ seconds (scanning in accordance with a period for capturing a moving picture) according to a timing signal supplied from the timing generator 24 to receive the light from the object that is incident through the lens unit 11, and photoelectrically converts the received light into an electrical signal corresponding to the amount of received light to output an analog image signal as the electrical signal to the CDS circuit 22. The image pickup device 21 includes charge coupled devices (CCDs) or complementary metal oxide semiconductors (CMOSs) with higher resolution than the standard moving-picture resolution (higher resolution than the standard definition (SD) or high definition (HD) format), such as 2304 pixels in the horizontal direction and 1728 pixels in the vertical direction.

The CDS circuit 22 performs correlated double sampling on noise component of the signal supplied from the image pickup device 21 to eliminate the noise component, and outputs the resulting signal to the A/D conversion circuit 23.

The A/D conversion circuit 23 performs A/D conversion on the analog image signal supplied from the CDS circuit 22, and outputs image data of the resulting digital signal to the subsequent stage. The signal output from the A/D conversion circuit 23 is a signal that can be subjected to appropriate processing later according to the purpose of use such as for a moving picture or a still image (that is, a "raw" signal that is not shaped into an image). The signal output from the A/D conversion circuit 23 is hereinafter referred to as an "original signal".

The original signal output from the A/D conversion circuit 23 is supplied to a filter processing/gamma correction circuit 31 of the image processing unit 13. When a switch 71 of the recording unit 17 is closed, the original signal output from the A/D conversion circuit 23 is also supplied to the recording unit 17. As discussed below, when a user gives an instruction to capture a still image during the capturing of the moving picture, the switch 71 is closed under control of the control unit 18.

The timing generator 24 generates a horizontal driving signal and a vertical driving signal based on a horizontal reset signal and a vertical reset signal supplied from the signal generator 25, respectively, and outputs the generated signals to the image pickup device 21. In response to the horizontal driving signal and the vertical driving signal, the signals of the pixel are read from the image pickup device 21.

The signal generator 25 generates a horizontal reset signal and a vertical reset signal, and outputs the generated signals to the timing generator 24.

The image processing unit 13 includes the filter processing/gamma correction circuit 31, a color-difference separation matrix circuit 32, and a resolution conversion circuit 33.

The filter processing/gamma correction circuit 31 performs processing, such as noise reduction, white-balance adjustment, and gamma correction, on the signal supplied from the A/D conversion circuit 23 of the image pickup unit 12 according to parameters set by the control unit 18, and outputs the resulting signal to the color-difference separation matrix circuit 32.

The color-difference separation matrix circuit 32 performs color-difference separation matrix processing on the signal supplied from the filter processing/gamma correction circuit 31 according to a parameter set by the control unit 18 to generate a luminance signal and a color-difference signal in accordance with the purpose of use, and outputs the generated signals to the resolution conversion circuit 33.

The resolution conversion circuit 33 generates an image having a predetermined size based on the signals supplied from the color-difference separation matrix circuit 32 according to a parameter (resolution parameter) set by the control unit 18, and outputs the signal of the generated image to a moving-picture compression processing circuit 41 of the moving-picture processing unit 14, an IP conversion circuit 51 of the still-image processing unit 15, a display control circuit 61 of the display unit 16, and a memory interface 73 of the recording unit 17.

For example, in moving-picture recording, the resolution conversion circuit 33 reduces the resolution on the basis of the signal supplied from the color-difference separation matrix circuit 32 to generate a signal of an image having a size complying with the digital video (DV) standard, and outputs the generated signal to the moving-compression processing circuit 41. In moving-picture recording, the signal output from resolution conversion circuit 33 is also supplied to the display control circuit 61 of the display unit 16, and is used to display a captured image.

In a case where the signal supplied from the color-difference separation matrix circuit 32 is an original signal temporarily saved in a memory 74, if the original signal is an interlaced signal (that is, if the image pickup device 21 performs interlaced scanning), the interlaced signal is converted into a progressive signal in order to record one still image. Thus, the resolution conversion circuit 33 outputs the generated signal of the image with the predetermined size to the IP conversion circuit 51 to perform interlace-to-progressive (IP) conversion. If the original signal supplied from the color-difference separation matrix circuit 32 is a progressive signal (that is, if the image pickup device 21 performs progressive scanning), the resolution conversion circuit 33 outputs the generated signal of the image with the predetermined size directly to the memory interface 73.

The control unit 18 sets parameters in the filter processing/gamma correction circuit 31, the color-difference separation matrix circuit 32, and the resolution conversion circuit 33, and the parameters differ depending on the type of processing, i.e., moving-picture processing to be performed on the original signal directly supplied from the image pickup unit 12 or still-image processing to be performed on the original signal that is temporarily saved in the memory 74 and that is fed back as the input to the image processing unit 13. Different processing is performed according to the set parameters. Specifically, moving-picture processing parameters are set to perform processing on the original signal supplied from the image pickup unit 12, and still-image processing parameters are set to perform processing on the original signal temporarily saved in the memory 74.

The image processing unit 13 further includes, in addition to the circuits shown in FIG. 1, various signal processing circuits such as a circuit for applying an effect, a circuit for adjusting the sharpness, a circuit for detecting a detection value, and a circuit for controlling a clipping range for use in motion-blur correction.

The moving-picture processing unit 14 includes the moving-picture compression processing circuit 41 and a recording medium 42 (hereinafter referred to as a "recording medium A", if necessary).

The moving-picture compression processing circuit 41 performs moving-picture encoding processing complying with the DV standard or the MPEG (Moving Picture Experts Group) standard on the signal supplied from the resolution conversion circuit 33 of the image processing unit 13, and records the resulting encoded moving-picture data on the recording medium A.

The recording medium A may be a recording medium removable from the photographing apparatus 1, such as a tape or a digital versatile disc (DVD), or may be a fixed recording medium such as a hard disk built in the photographing apparatus 1. The encoded moving-picture data supplied from the moving-picture compression processing circuit 41 is recorded on the recording medium A. The encoded moving-picture data recorded on the recording medium A is read by the moving-picture compression processing circuit 41, and is played back on the photographing apparatus 1 or transferred to an external apparatus such as a personal computer.

The still-image processing unit 15 includes the IP conversion circuit 51 and a still-image compression circuit 52.

The IP conversion circuit 51 converts the interlaced signal supplied from the resolution conversion circuit 33 into a progressive signal, and outputs the resulting progressive signal to the memory interface 73. As described above, if the image pickup device 21 performs interlaced scanning, in the still-image recording, an interlaced signal is supplied from the resolution conversion circuit 33.

The still-image compression circuit 52 performs compression processing based on JPEG (Joint Photographic Expert Group) or the like on the signal (luminance and color-difference signals) output from the resolution conversion circuit 33 to the memory interface 73 or the signal output from the IP conversion circuit 51 to the memory interface 73, and records the resulting encoded still-image data on the memory 74 through the memory interface 73. For example, the encoded still-image data generated from the original signal is recorded on the memory 74, and is then transferred to and recorded on a recording medium 76.

The display unit 16 includes the display control circuit 61 and a display 62.

During capturing of the moving picture, the display control circuit 61 displays an image captured by the image pickup device 21 on the display 62 according to the output from the resolution conversion circuit 33. During playback of the moving picture recorded on the recording medium A, the display control circuit 61 displays the recorded moving picture on the display 62 according to the signal supplied from the moving-picture compression processing circuit 41.

During playback of the still image generated based on the original signal and recorded on the memory 74 or the still image recorded on the recording medium 76, the display control circuit 61 displays the still image at the resolution of the display 62 according to the signal expanded by the still-image compression circuit 52 and supplied through the memory interface 73.

Further, as discussed in detail below, during the capturing of the moving picture, the display control circuit 61 displays an icon indicating a still-image recording destination and an indicator indicating the number of recordable still images (i.e., the number of still images for which the original signal can be saved in the memory 74) side-by-side at predetermined positions on the display 62. When the capturing of the moving picture has been completed, the display control circuit 61 generates a still image based on the original signal saved in the memory 74, and displays at a predetermined position on the display 62 an indicator indicating that the generated still image is currently recorded on the recording medium 76.

The display 62 is formed of a liquid crystal display (LCD) or the like, and displays a moving picture, a still image, etc., according to the signal supplied from the display control circuit 61.

The recording unit 17 includes switches 71 and 72, the memory interface 73, the memory 74, an original signal compression processing circuit 75, and the recording medium 76 (hereinafter referred to as a "recording medium B", if necessary).

The switch 71 is closed under the control of the control unit 18 to pass the currently supplied original signal.

When the user gives an instruction to record a still image during the capturing of the moving picture, the switch 71 is closed by the control unit 18, and the original signal branched from the signal fed from the image pickup unit 12 to the image processing unit 13 is supplied to the switch 72 that provides a path to the memory 74 and the original signal compression processing circuit 75. The switch 71 is closed by the control unit 18 also when the original signal is temporarily recorded in the memory 74 and the moving-picture processing is stopped, and the original signal temporarily recorded in the memory 74 is supplied to the first-stage circuit of the image processing unit 13 through the switch 71 as the input to the image processing unit 13.

The switch 72 is connected to either of terminals a and b under the control of the control unit 18, and passes the currently supplied original signal.

The memory interface 73 is an interface with the memory 74, through which data is written to the memory 74 or data is read from the memory 74.

The memory 74 is formed of a RAM or the like, and temporarily stores the original signal or the like under control of the memory interface 73. The memory 74 has a plurality of areas for recording various data.

Figure 2:
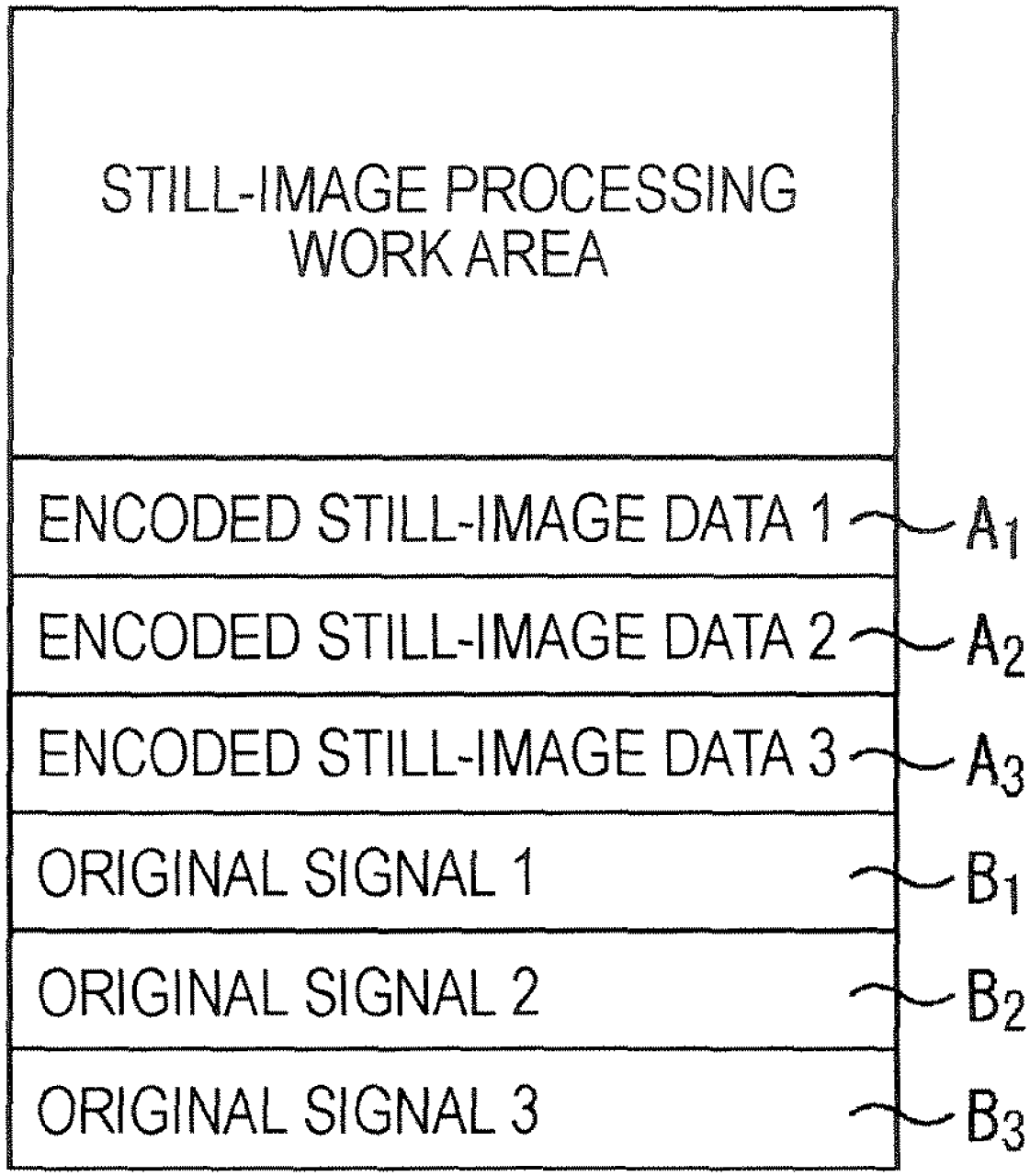
FIG. 2 is a diagram showing an example of areas formed in a memory shown in FIG. 1.

FIG. 2 is a diagram showing an example of the areas formed in the memory 74.

As shown in FIG. 2, the memory 74 has a still-image processing work area, areas $A_1$ to $A_3$, and areas $B_1$ to $B_3$.

The still-image processing work area is an area used when the IP conversion circuit 51 performs IP conversion or when the still-image compression circuit 52 performs compression or expansion processing.

The areas $A_1$ to $A_3$ are areas in which encoded still-image data generated based on an original signal is temporarily recorded. In each of the areas $A_1$ to $A_3$, for example, encoded still-image data generated based on an original signal recorded in each of the areas $B_1$ to $B_3$ is recorded.

The areas $B_1$ to $B_3$ are areas in which original signals are recorded. That is, each of the areas $B_1$ to $B_3$ is a location in which an original signal is saved when an instruction for recording a still image is issued during the capturing of the moving picture. When the moving-picture processing is stopped, the original signals recorded in the areas $B_1$ to $B_3$ are sequentially read and used to generate still images.

In this manner, the memory 74 is provided with a plurality of areas for recording original signals, and an original signal obtained in response to the first instruction is recorded in the area $B_1$. An original signal obtained in response to the second instruction is recorded in the area $B_2$, and an original signal obtained in response to the third instruction is recorded in the area $B_3$. The user can therefore record three still images during a single moving-picture capturing operation.

If the image pickup device 21 performs interlaced scanning, IP conversion is performed using original signals of two fields (ODD/EVEN) to generate one still image. For example, the original signals of two fields are recorded in sequential areas.

Referring back to FIG. 1, the original signal compression processing circuit 75 compresses the original signal supplied through the switch 71 under the control of the control unit 18, and outputs the compressed original signal to the memory interface 73 through the switch 72. If a compressed original signal is recorded in the memory 74, the original signal compression processing circuit 75 expands the compressed original signal read by the memory interface 73 and supplied through the switch 72, and outputs the expanded original signal to the image processing unit 13 through the switch 71.

Accordingly, the original signal output from the image pickup unit 12 is compressed, if necessary. The original signal compressed by the original signal compression processing circuit 75 is selected by the switch 72, and is recorded as the signal used for still-image recording, thereby efficiency utilizing the capacity of the memory 74.

The original signal compressed or expanded by the original signal compression processing circuit 75 is a signal that can be subjected to appropriate processing later according to the purpose of use, such as for a moving picture or a still image, but is not a signal subjected to processing for forming a moving picture (image processing performed by the image processing unit 13) or processing for forming a still image. The original signal is therefore a "raw" signal, which is similar to the original signal saved in the memory 74 without being compressed.

The recording medium B is formed of, for example, a memory card equipped with a built-in flash memory, which is removable from the photographing apparatus 1. The encoded still-image data generated based on the original signal is recorded on the recording medium B.

The control unit 18 includes a system control circuit 81 and a memory 82. The control unit 18 and the components shown in FIG. 1 are connected by signal lines (not shown).

The system control circuit 81 is formed of a microcomputer or the like, and controls the overall operation of the system according to a user's button input received by an external interface (not shown) connected to the control unit 18. The external interface alternately receives the start/end of recording of a moving picture each time a moving-picture recording button is pressed, and receives recording of a still image each time a still-image recording button is pressed. The external interface also receives a user's operation, such as setting the image quality or an effect, performed by the user using various buttons, and receives an input from a gyro sensor (not shown). In response to the input from the gyro sensor, the system control circuit 81 determines the amount of camera shake during photographing.

The system control circuit 81 may be formed of, for example, two microcomputers. One of the microcomputers may control the overall photographing operation, and the other microcomputer may control a user interface operation such as receiving an input given by the user or display of the display 62.

The memory 82 stores various data necessary for the system control circuit 81 to control the respective components, such as photographic conditions.

Figure 3:
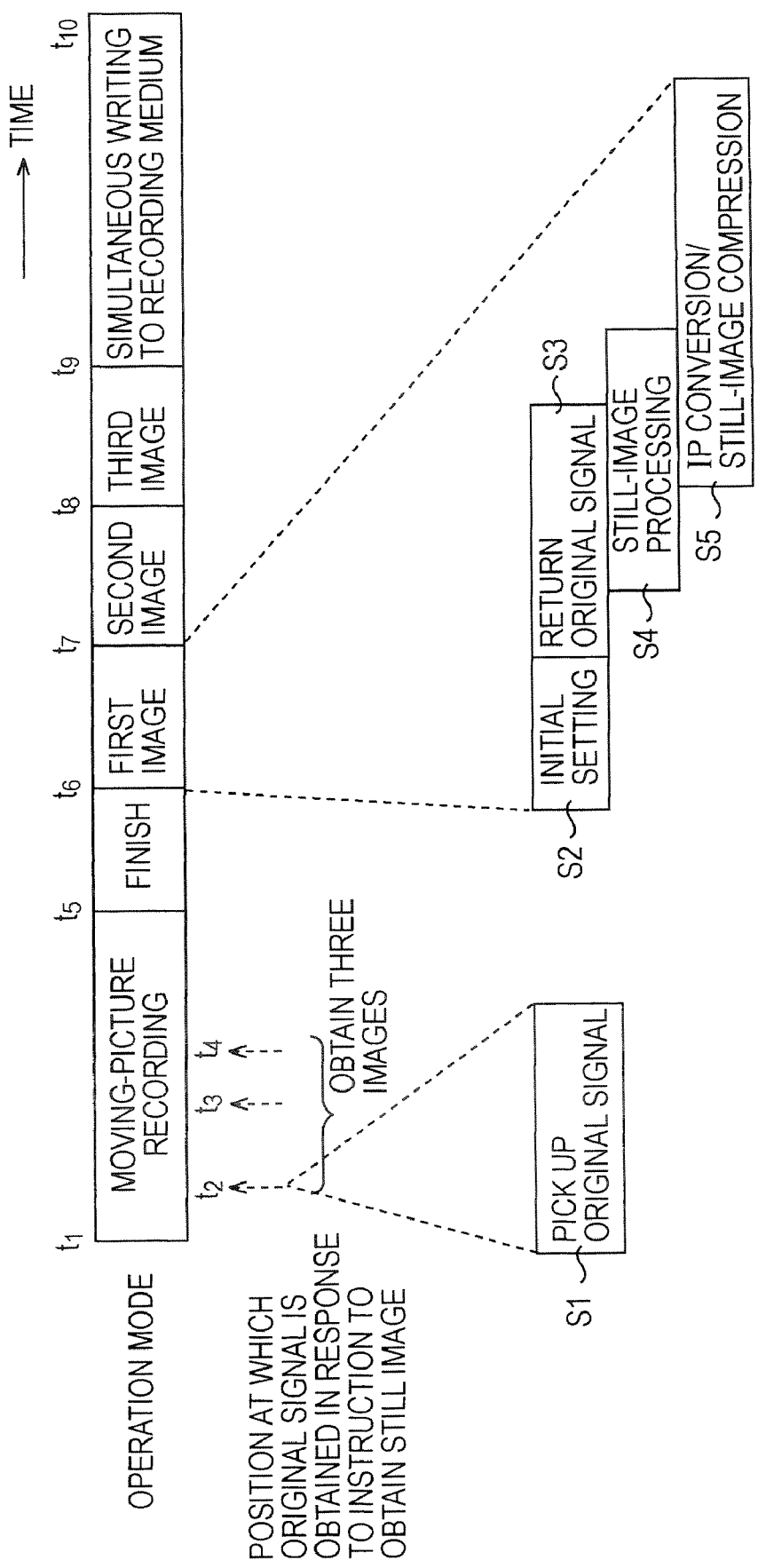
FIG. 3 is a diagram showing an example of the operation of a system control circuit.

The operation of the system control circuit 81 will be described with reference to FIG. 3. In FIG. 3, the horizontal direction represents time.

For example, at time $t_1$, when the user presses the moving-picture recording button to issue an instruction to start recording of a moving picture, the system control circuit 81 controls the image pickup unit 12 to start the pickup operation, and sets the moving-picture processing parameters to control the respective components of the image processing unit 13 to process the original signal output from the image pickup unit 12. The system control circuit 81 further controls the moving-picture processing unit 14 to record the encoded moving-picture data obtained by encoding the processing result of the image processing unit 13 on the recording medium A.

During the recording of the moving picture on the recording medium A, when the user presses the still-image recording button at a timing indicated by a dotted arrow to issue an instruction to record a still image, as indicated in state $S_1$, the system control circuit 81 performs compression processing, if necessary, and controls the recording unit 17 to pick up the original signal output from the image pickup unit 12 (to temporarily save the original signal in the memory 74) while continuously recording the moving picture.

At this time, the system control circuit 81 stores photographic conditions in the memory 82 of the control unit 18. The photographic conditions are conditions under which the moving picture is currently being captured, such as an aperture value and a zoom position.

The pickup of the original signal and the storage of the photographic conditions are performed each time an instruction for recording a still image is issued. In the example shown in FIG. 3, instructions for recording still images are issued at time $t_2$, $t_3$, and $t_4$.

At time $t_5$, when the user presses the moving-picture recording button to issue an instruction to terminate the recording of the moving picture, the system control circuit 81 stops the moving-picture processing currently being performed. At time $t_6$, the system control circuit 81 starts to process the first still image. That is, as indicated in state $S_2$, the system control circuit 81 performs initial setting for still-image processing.

For example, the system control circuit 81 performs initial setting by setting in the respective components of the image processing unit 13 the still-image processing parameters determined according to the photographic conditions stored in the memory 82 so that the desired still-image processing can be performed. The system control circuit 81 also switches the setting to be switched between the moving-picture processing and the still-image processing, such as the edge enhancement level. The system control circuit 81 further performs setting for expansion or IP conversion of the original signal, if necessary.

When the initial setting is completed, as indicated in state $S_3$, the system control circuit 81 controls the switch 71 to be closed to supply the original signal temporarily saved in the memory 74 to the first-stage circuit of the image processing unit 13. As indicated in state $S_4$, the system control circuit 81 controls the respective components of the image processing unit 13 to perform the still-image image processing in a sequential manner. The still-image signal subjected to the processing by the image processing unit 13 is stored in the still-image processing work area of the memory 74 through the still-image processing unit 15 or the like.

As indicated in state $S_5$, the system control circuit 81 controls the still-image processing unit 15 to perform appropriate processing, such as IP conversion and/or still-image compression, according to the signal stored in the still-image processing work area of the memory 74. The data generated by the still-image processing unit 15 is recorded in the memory 74 as encoded still-image data. In this way, one still image is efficiently processed sequentially in a pipeline fashion.

In a case where still images are generated based on the original signals and all the still images are simultaneously recorded on the recording medium B, a generated still image is stored in the memory 74 until all the other still images have been generated.

When the first still image has been processed, at time $t_7$, the system control circuit 81 starts to process the second still image in a manner similar to that for the first still image. When the second still image has been processed, at time $t_8$, the system control circuit 81 starts to process the third still image in a similar manner.

When the third still image has been processed, that is, when all the still images have been processed, at time $t_9$, the system control circuit 81 simultaneously records all the three still images stored in the memory 74 on the recording medium B.

For example, when the recording of the still images on the recording medium B has been completed, at time $t_{10}$, the system control circuit 81 deletes the original signals stored in the memory 74, and can record a new original signal.

The control unit 18 controls the respective components of the photographing apparatus 1 in the manner described above.

Figure 4:
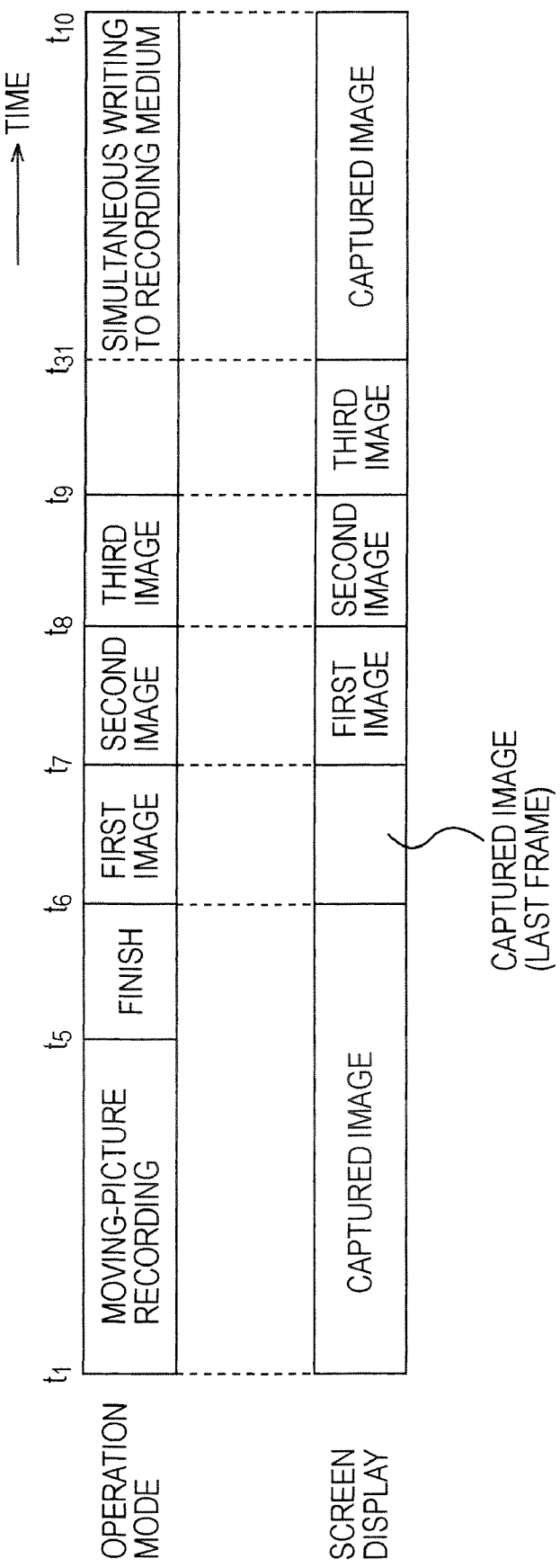
FIG. 4 is a diagram showing an example of the screen display controlled by the system control circuit.

The screen display of the display 62 during the operation described above will be described with reference to FIG. 4. A time chart illustrating an operation mode shown in FIG. 4 is the same as the time chart illustrating the operation mode shown in FIG. 3.

At time $t_1$, when the user presses the moving-picture recording button to issue an instruction to start recording of a moving picture, a captured image is displayed on the display 62. The user can therefore confirm the moving picture captured by the lens 11 and recorded on the recording medium A.

During the recording of the moving picture, an icon indicating a still-image recording destination and an icon indicating the number of images that can be captured are displayed side-by-side on the display 62 at predetermined positions, such as at the upper right of the screen, so as to be superimposed on the captured image.

FIG. 5 is a diagram showing example icons displayed during the recording of the moving picture.

A recording-destination indicator icon 101 is an icon indicating a recording destination of still images, i.e., the recording medium B. In the example shown in FIG. 5, the recording-destination indicator icon 101 indicates a memory card.

Three rectangular number-of-available-shots indicator icons 102 displayed side-by-side indicate that the number of still images that can be captured during the recording of the moving picture is three. Each of the number-of-available-shots indicator icons 102 is displayed in a different color each time an original signal is saved in the memory 74 in response to an instruction to record a still image, thus allowing the user to confirm the remaining number of still images that can be captured.

FIG. 6 is a diagram showing an example of the display transition of the number-of-available-shots indicator icons 102.

For example, when an instruction for recording a still image is issued for the first time after the start of the capturing of the moving picture (at the time $t_2$ shown in FIG. 3), as shown in the top row of FIG. 6, the left icon in the three number-of-available-shots indicator icons 102 is displayed in a different color from the original color, thereby indicating that the first recording (more specifically, the saving in the memory 74 because the still image on the recording medium B is recorded after the capturing of the moving picture has been completed) has been completed.

For example, the left icon in the number-of-available-shots indicator icons 102 is displayed in a red-like color such as orange, thereby indicating that processing similar to the recording has been performed. Character "REC" displayed on the display 62 during the recording of the moving picture and a mark assigned to the moving-picture recording button to be operated to start the recording of the moving picture are generally displayed in red. An indicator indicating that the original signal has been saved but has not yet been recorded is displayed in orange.

When an instruction for recording a still image is issued for the second time (at the time $t_3$), as indicated by a hollow arrow $A_1$ shown in FIG. 6, the center icon in the three number-of-available-shots indicator icons 102 is displayed in a different color from the original color, thereby indicating that the second recording has been completed.

When an instruction for recording a still image is issued for the third time (at the time $t_4$), as indicated by a hollow arrow $A_2$ shown in FIG. 6, the right icon in the three number-of-available-shots indicator icons 102 is displayed in a different color from the original color, thereby indicating that the third recording has been completed.

Referring back to FIG. 4, on the display 62 on which the above-described icons are displayed at the predetermined positions, the currently captured image is displayed until the time $t_6$ at which the user gives an instruction to terminate the recording of the moving picture and the still-image processing is started.

For the period from the time $t_6$ to the time $t_7$ during which the first still image is processed (the processing in the states $S_2$ to $S_5$ shown in FIG. 3), for example, a captured image of one frame captured immediately before the still-image processing is started is displayed on the display 62 as an still image.

An indicator indicating that the still image generated based on the original signal saved in the memory 74 is currently recorded on the recording medium B is further displayed on the display 62 at a predetermined position, such as at the upper right of the screen, so as to be superimposed on the captured image of one frame.

Figure 7:
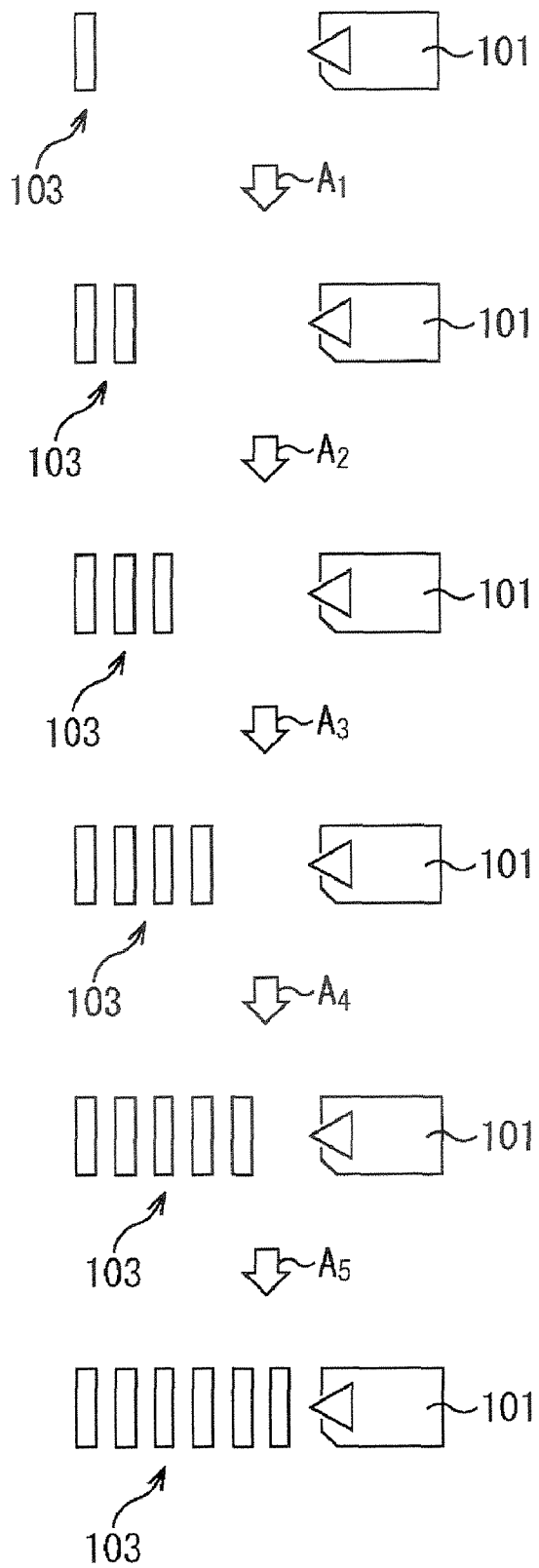
FIG. 7 is a diagram showing an example of the display transitions of an indicator.

FIG. 7 is a diagram showing an example of the display transitions of the indicator.

As shown in FIG. 7, an indicator 103 is displayed side-by-side with the recording-destination indicator icon 101 in place of the number-of-available-shots indicator icons 102. The display of the indicator 103 is changed so that the number of bars of the indicator 103 increases in the manner indicated by hollow arrows $A_1$ to $A_5$, starting from a first state shown in the top row of FIG. 7 in which one bar is displayed. When the display is in a state shown in the bottom row of FIG. 7 as a result of the state transition indicated by the hollow arrow $A_5$, the display of the indicator 103 returns to the first state. The above-described display transitions are repeated until the still-image processing ends.

For the period from the time $t_7$ to the time $t_8$ during which the second still image is processed, for example, the first still image generated until the time $t_7$ is displayed on the display 62. For the period from the time $t_8$ to the time $t_9$ during which the third still image is processed, for example, the second still image generated until the time t8 is displayed on the display 62.

For the period from the time $t_7$ to the time $t_8$ during which the second still image is processed and for the period from the time $t_8$ to the time $t_9$ during which the third still image is processed, the indicator 103 shown in FIG. 7 is also displayed on the display 62 so as to be superimposed on the currently displayed still images.

At the time $t_9$, when the third still image has been processed, an internal operation starts for sequentially writing the still images to the recording medium B in order from the first still image. Until time $t_{31}$, for example, the third still image generated until the time $t_9$ is displayed on the display 62.

After the generated still images that are generated based on the original signals are sequentially displayed, the captured image is displayed on the display 62. When an instruction for capturing a moving picture, a similar display operation is performed again.

Figure 8:
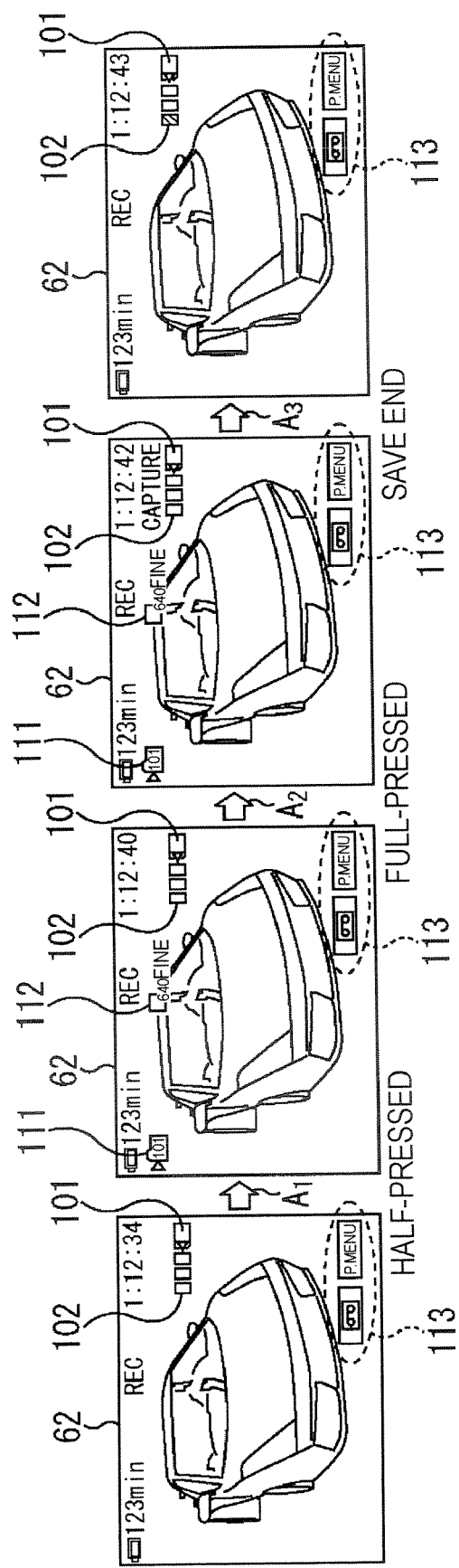
FIG. 8 is a diagram showing a specific display example of a display.
Figure 9:
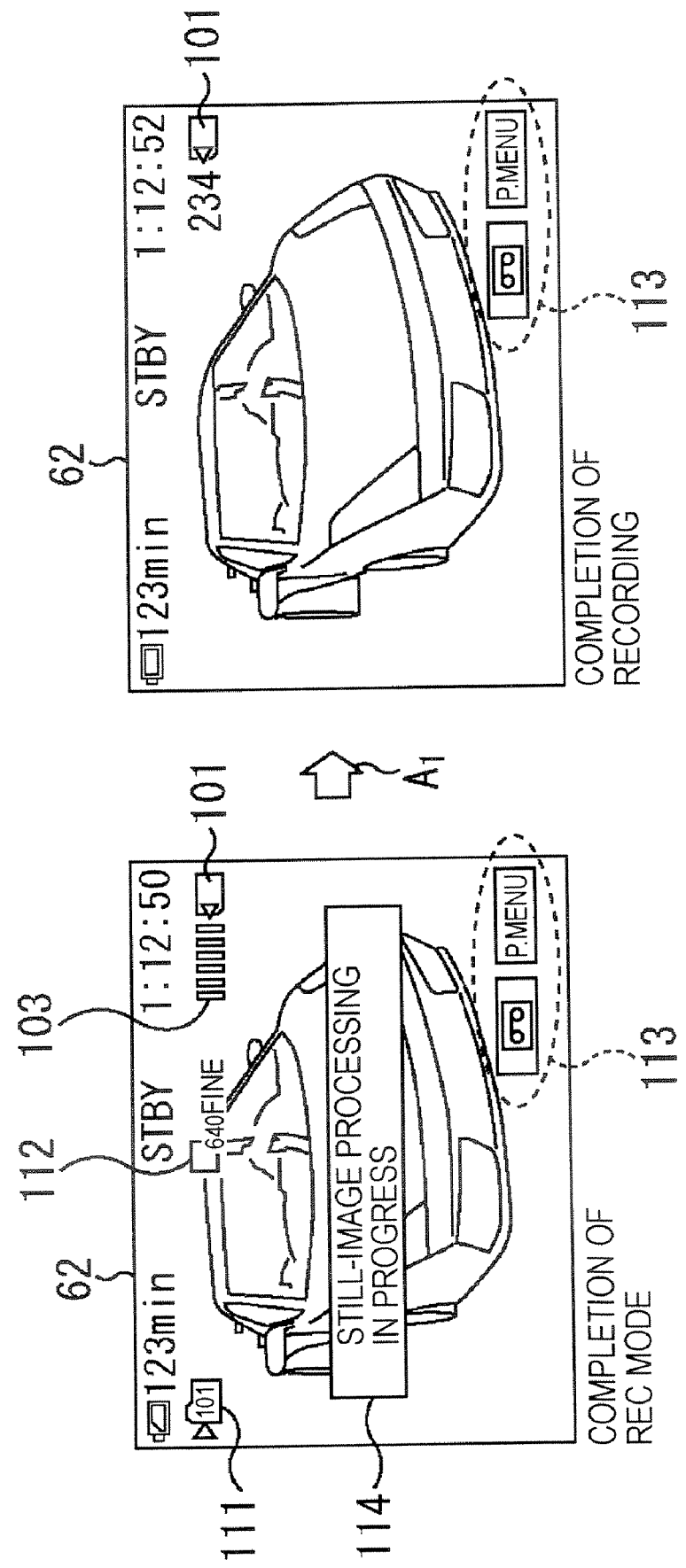
FIG. 9 is a diagram showing another specific display example of the display.

FIGS. 8 and 9 are diagrams showing specific examples of screens displayed on the display 62.

The screen shown in the leftmost column of FIG. 8 is a screen displayed when the recording of a moving picture is in progress. As described above, when the recording of the moving picture is in progress, a captured image is displayed full-screen on the display 62, and the recording-destination indicator icon 101 and the number-of-available-shots indicator icons 102 are displayed side-by-side so as to be superimposed on the captured image. On the screen shown in the leftmost column of FIG. 8, the recording-destination indicator icon 101 and the number-of-available-shots indicator icons 102 are displayed at the upper right of the screen. The three number-of-available-shots indicator icons 102 are displayed in the original color, and indicate that no still image has yet been captured.

On the screen shown in the leftmost column of FIG. 8, further, character "123 min" indicating the available battery time is displayed at the upper left of the screen, and character "REC" indicating that the capturing (recording) of the moving picture is in progress is displayed in, for example, red at the upper center of the screen. At the upper right of the screen above the recording-destination indicator icon 101 and number-of-available-shots indicator icons 102, number "1:12:34" indicating the recording position on the tape is displayed. Tool buttons 113 operated to select various tools are further displayed at the lower right of the screen.

When the user half-presses a still-image recording button provided on a surface of a housing of the photographing apparatus 1 in the state where the screen shown in the leftmost column of FIG. 8 is displayed, as indicated by a hollow arrow $A_1$, information regarding still image shooting is further displayed on the display 62 in addition to the currently displayed information.

On the screen as a result of the transition indicated by the hollow arrow $A_1$, an icon 111 indicating a folder as a recording destination of still images and an icon 112 indicating the quality of a still image to be recorded are further displayed. In this manner, information regarding still image shooting, such as the icons 111 and 112, is displayed when the user is to capture a still image.

When the user fully presses the still-image recording button in the state where the screen as a result of the transition indicated by the hollow arrow $A_1$ is displayed (in the state where the still-image recording button is half-pressed), as indicated by a hollow arrow $A_2$, character "CAPTURE" is displayed above the recording-destination indicator icon 101 and the number-of-available-shots indicator icons 102, thereby indicating that an original signal has been saved according to the operation given by the user.

When the original signal has been saved, as indicated by a hollow arrow $A_3$, the left icon in the three number-of-available-shots indicator icons 102 is displayed in a different color. A picture of an automobile displayed on the screens shown in FIG. 8 represents a captured image (moving picture).

For example, if an instruction for terminating the capturing of the moving picture is issued in the state where one still image has been recorded in the manner described above, a screen shown in the left column of FIG. 9 is displayed. That is, character "STBY" indicating that the photographing apparatus 1 stands by (or waits for photographing) is displayed in place of the character "FREC" shown in FIG. 8, and the indicator 103 is displayed adjacent to the recording-destination indicator icon 101. A message 114, "the still-image processing in progress", is further displayed substantially at the center of the screen shown in the left column of FIG. 9, and informs the user that the still-image processing is in progress.

When the still image has been recorded, a screen shown in the right column of FIG. 9 is displayed, and a number is displayed in place of the indicator 103. On the screen shown in the right column of FIG. 9, number "234" is displayed adjacent to the recording-destination indicator icon 101, and indicates that the recording medium B has a capacity capable of further recording 234 still images.

Accordingly, the recording-destination indicator icon 101 and the number-of-available-shots indicator icons 102 are displayed on the display 62 when the recording of the moving picture is in progress, and each of the number-of-available-shots indicator icons 102 is displayed in a different color each time a still image is recorded. The user can therefore intuitively understand a limited number of still images that can be recorded during the capturing of the moving picture. The user can also understand that the maximum number of images that can be captured is three from the number of number-of-available-shots indicator icons 102.

Further, after the user fully presses the still-image recording button to capture a still image, one of the number-of-available-shots indicator icons 102 is displayed in, for example, orange until the recording of the moving picture has been completed. The display allows the user to understand that the original signal for recording the still image is still stored.

Further, after the capturing of the moving picture has been completed, the indicator 103 and the message 114 are displayed, and the generated still images are sequentially displayed full-screen on the display 62, thus allowing the user to understand that the processing of the still images is in progress.

Figure 10:
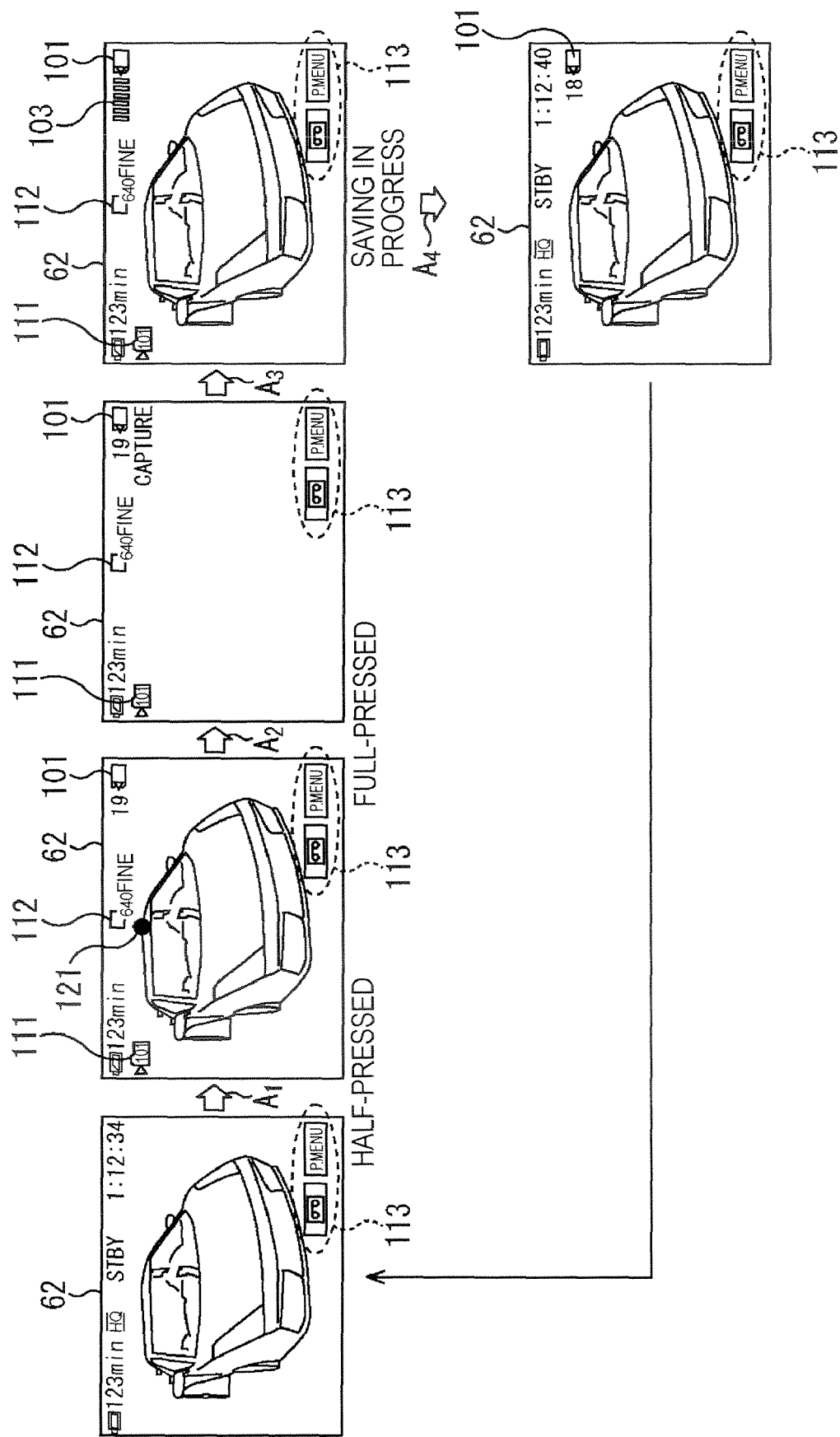
FIG. 10 is a diagram showing still another specific display example of the display.

FIG. 10 is a diagram showing a specific example of screens displayed on the display 62 in response to an instruction to capture a still image in the state where the photographing apparatus 1 is in the standby mode.

In the standby mode, still images can continuously be recorded until the capacity of the recording medium B becomes full.

The screen shown in the leftmost column of FIG. 10 is a screen displayed in the standby mode. In the standby mode, a captured image is displayed on the display 62.

When the user half-presses the still-image recording button provided on the surface of the housing of the photographing apparatus 1 in the state where the screen shown in the leftmost column of FIG. 10 is displayed, as indicated by a hollow arrow $A_1$, information regarding still image shooting is further displayed on the display 62 in addition to the currently displayed information.

On the screen as a result of the transition indicated by the hollow arrow $A_1$ shown in FIG. 10, the icon 111 indicating a folder as a recording destination of still images, the icon 112 indicating the quality of a still image to be recorded, and the recording-destination indicator icon 101 are further displayed as the information regarding still image shooting. Number "19" is displayed adjacent to the recording-destination indicator icon 101, and indicates that the remaining number of images that can be captured is 19.

A focus icon 121 indicating that the focus is locked is also displayed below the icon 112. The automatic focusing function is enabled when a still image is to be captured in the standby mode.

When the user fully presses the still-image recording button in the state where the screen as a result of the transition indicated by the hollow arrow $A_1$ is displayed (in the state where the still-image recording button is half-pressed), as indicated by a hollow arrow $A_2$, a black screen is momentarily displayed on the display 62, thereby indicating that the shutter is released and a still image is captured.

When the black screen is displayed, as indicated by a hollow arrow $A_3$, the indicator 103 is displayed adjacent to the recording-destination indicator icon 101, thereby indicating that the recording of the still image on the recording medium B is in progress. The recorded still image is also displayed full-screen on the display 62.

When the still image has been recorded, as indicated by a hollow arrow $A_4$, the captured image is displayed full-screen again on the display 62. A number indicating the remaining number of images that can be captured is also displayed adjacent to the recording-destination indicator icon 101. On the screen obtained as a result of the transition indicated the hollow arrow $A_4$ shown in FIG. 10, the remaining number of images that can be captured is 18, and the number of images that can be captured decreases by one since a single still-image capturing operation was performed.

The screens displayed in response to an instruction to capture a still image therefore differ between the standby mode and the mode in which the capturing of the moving picture is in progress.

In the foregoing description, original signals corresponding to three still images can be saved in the memory 74. In this case, for example, if an instruction for capturing a still image is issued four or more times during a single moving-picture capturing operation, a message 131 shown in FIG. 11 is displayed on the display 62 each time the instruction is issued.

Figure 11:
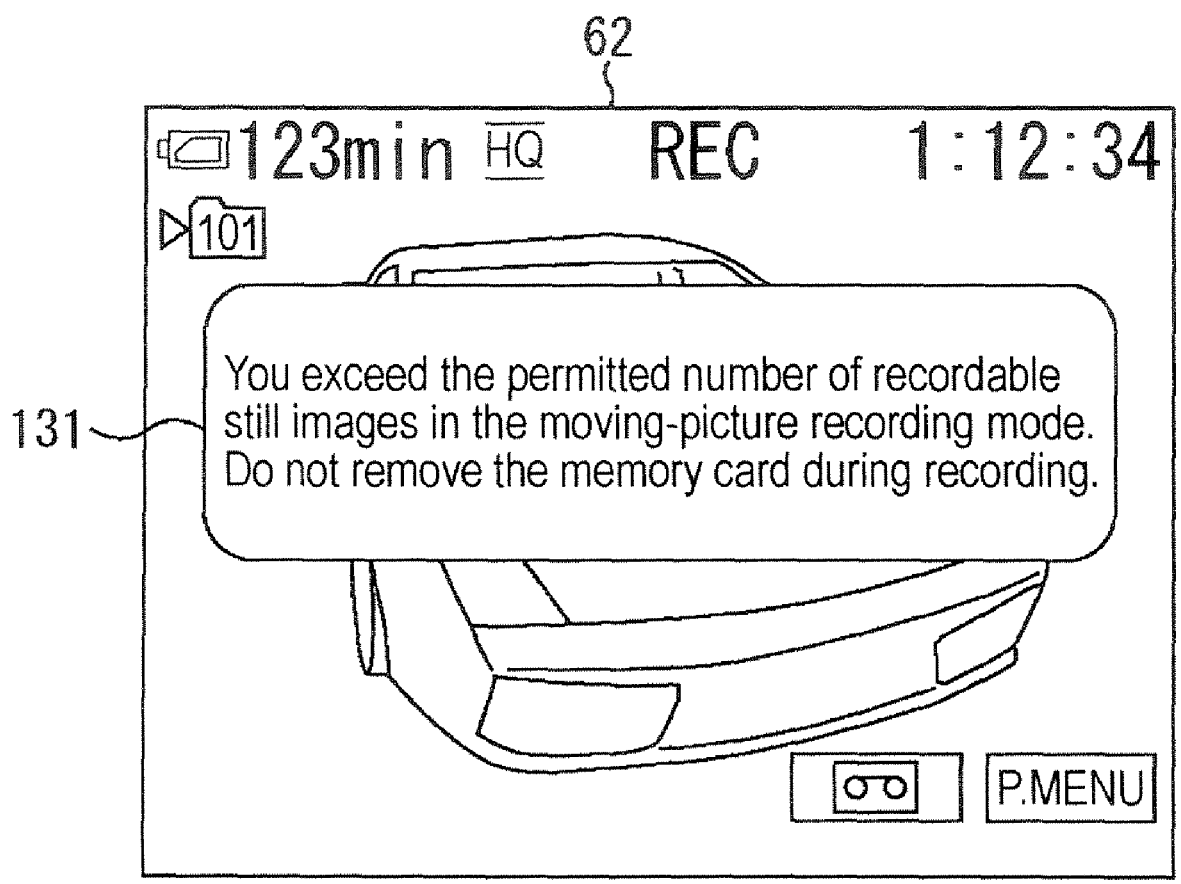
FIG. 11 is a diagram showing an example of a message.

In the example shown in FIG. 11, message "You exceed the permitted number of recordable still images in the moving-picture recording mode. Do not remove the memory card during recording." is displayed, thereby notifying the user that the user is not permitted to shoot more than three still images.

In the foregoing description, the still-image recording destination is a memory card, and the recording-destination indicator icon 101 displayed on the display 62 represents a memory card. For example, in a case where the recording medium A is a recording medium capable of recording still images, such as a DVD, the user can select one of the DVD (recording medium A) and the memory card (recording medium B) as the still-image recording destination, and the display of the recording-destination indicator icon 101 is switched depending on the recording destination selected in advance by the user.

Figure 12A:
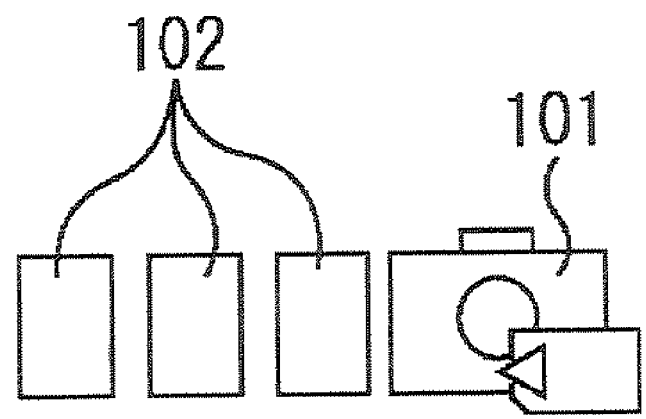
FIGS. 12A and 12B are diagrams showing other examples of the icons.
Figure 12B:
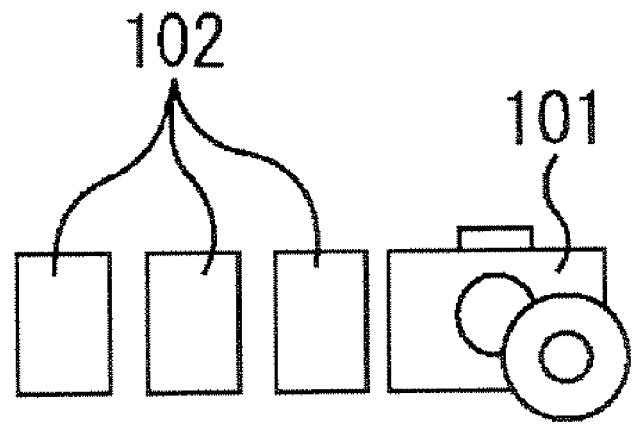

FIGS. 12A and 12B are diagrams showing examples of the recording-destination indicator icon 101.

FIG. 12A is a diagram showing an example of the recording-destination indicator icon 101 in a case where the memory card inserted in the photographing apparatus 1 is designated as the still-image recording destination, and FIG. 12B is a diagram showing an example of the recording-destination indicator icon 101 in a case where the DVD set in the photographing apparatus 1 is designated as the still-image recording destination. In the case where a still image is recorded on a DVD as the recording medium A, the data of the still image generated by the still-image processing unit 15 and temporarily stored in the memory 74 is supplied to the moving-picture processing unit 14 for recording.

The operation of the photographing apparatus 1 will be described with reference to flowcharts.

Figure 13:
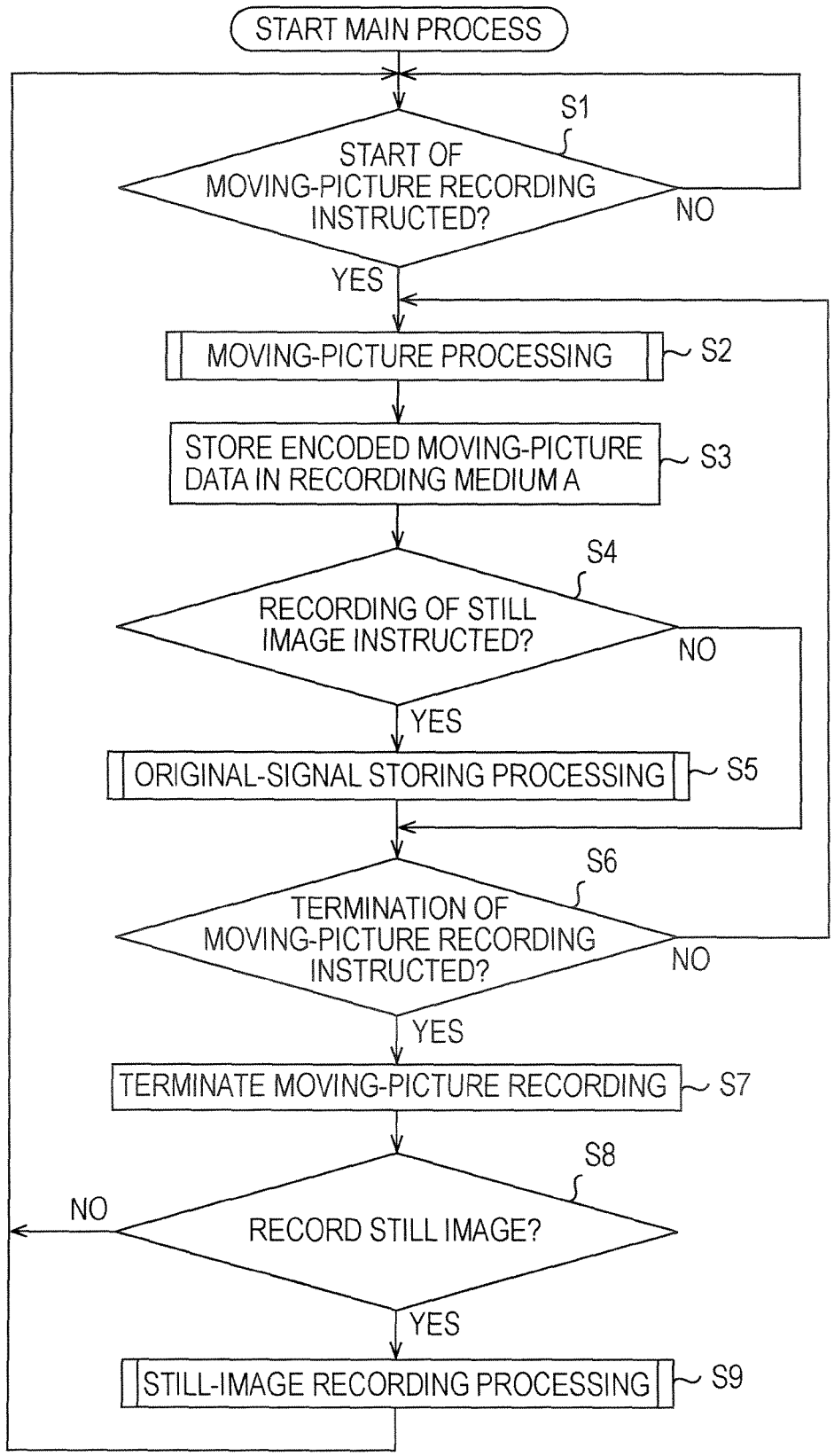
FIG. 13 is a flowchart showing the main process of the photographing apparatus.

First, the overall process (main operation) of the photographing apparatus 1 will be described with reference to a flowchart shown in FIG. 13. The process starts, for example, when the photographing apparatus 1 is turned on and is in the standby mode.

In step S1, the system control circuit 81 of the photographing apparatus 1 determines whether or not the user has given an instruction to start recording of a moving picture, and stands by until the instruction has been given.

It is determined in step S1 that the user has given an instruction to start recording of a moving picture by pressing the moving-picture recording button, then, in step S2, the system control circuit 81 performs moving-picture processing. By performing the moving-picture processing, the original signal output from the image pickup unit 12 is subjected to processing specific to moving pictures, and encoded moving-picture data is obtained. The details of the moving-picture processing are described below with reference to a flowchart shown in FIG. 14.

In step S3, the moving-picture compression processing circuit 41 of the moving-picture processing unit 14 records on the recording medium A the encoded moving-picture data obtained by performing the moving-picture processing.

In step S4, the system control circuit 81 determines whether or not the user has given an instruction to record a still image. If it is determined that the user has given an instruction to record a still image by pressing the still-image recording button, then, in step S5, the system control circuit 81 performs an original signal storing process. By performing the original signal storing process, the original signal output from the image pickup unit 12 is temporarily recorded in the memory 74. The details of the original signal storing process are described below with reference to a flowchart shown in FIG. 15.

If it is determined in step S4 that the user has not given an instruction to record a still image, the system control circuit 81 skips step S5.

In step S6, the system control circuit 81 determines whether or not the user has given an instruction to end the recording of the moving picture. If it is determined that the instruction has not been given, the process returns to step S2, and the subsequent processing is repeatedly performed.

If it is determined in step S6 that the user has pressed the moving-picture recording button to give an instruction to stop the recording of the moving picture, then, in step S7, the system control circuit 81 terminates the recording of the moving picture.

In step S8, the system control circuit 81 determines whether or not the still image is to be recorded. If the recording of the still image has not been instructed during the recording of the moving picture, it is determined that the still image is not to be recorded. Then, the process returns to step S1, and the subsequent processing is repeatedly performed.

If the recording of the still image has been instructed during the recording of the moving picture and the original signal is recorded in the memory 74, the system control circuit 81 determines in step S8 that the still image is to be recorded. In step S9, the system control circuit 81 performs a still-image recording process. By performing the still-image recording process, a still image is generated based on the original signal, and the generated still image is recorded on the recording medium B. The details of the still-image recording process are described below with reference to a flowchart shown in FIG. 16.

Also when the still-image recording process has been completed, the process returns to step S1, and the subsequent processing is performed.

Figure 14:
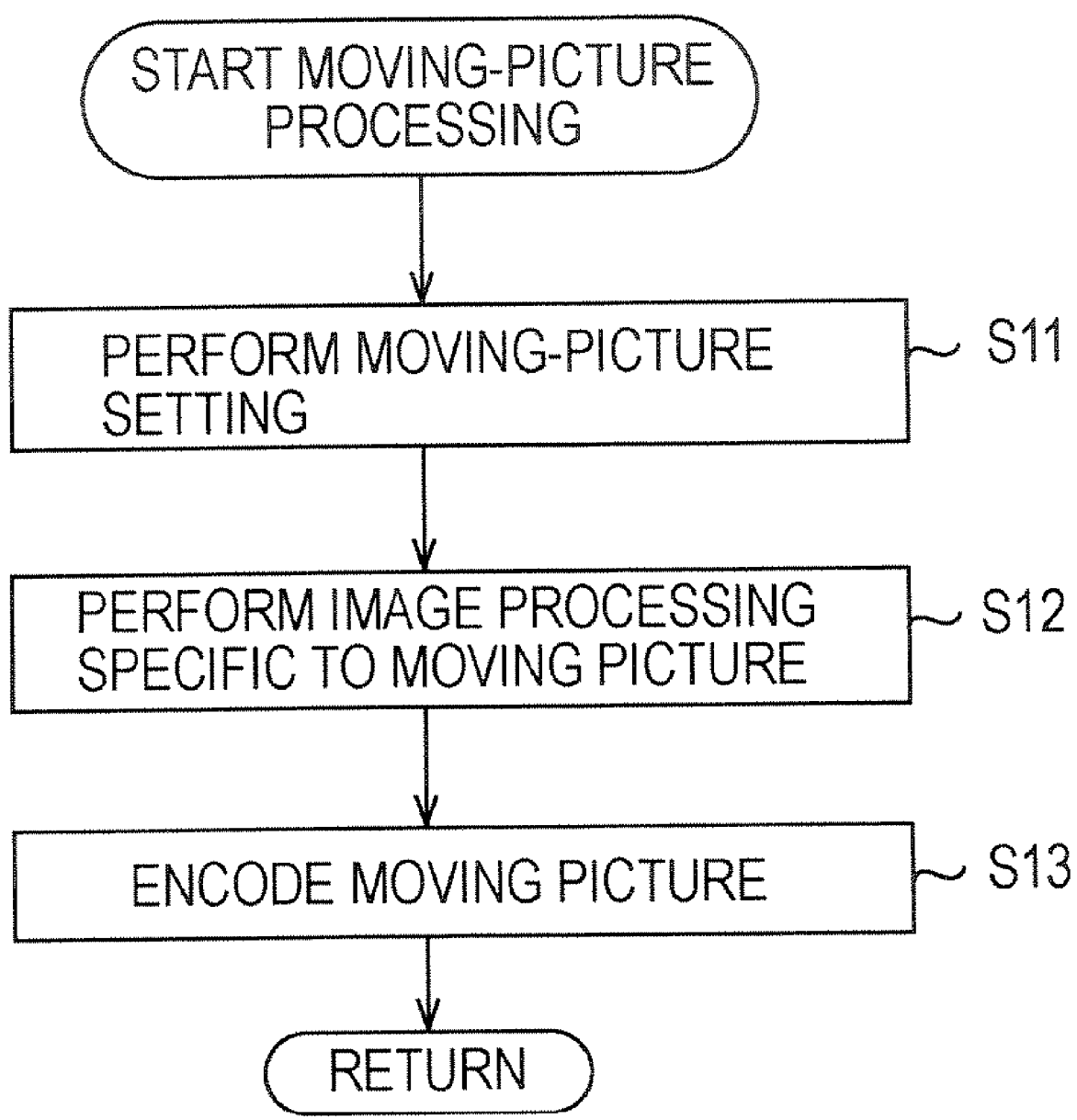
FIG. 14 is a flowchart showing moving-picture processing performed in step S2 shown in FIG. 13.

The moving-picture processing performed in step S2 shown in FIG. 13 will be described with reference to the flowchart shown in FIG. 14.

In step S11, the system control circuit 81 sets the moving-picture processing parameters in the respective components of the image processing unit 13. In step S12, the system control circuit 81 controls the respective components of the image processing unit 13 to perform the moving-picture processing on the original signal output from the image pickup unit 12.

In step S13, the system control circuit 81 controls the moving-picture processing unit 14 to encode the processing result of the image processing unit 13. Then, the process returns to step S2 shown in FIG. 13; and the subsequent processing is performed.

Figure 15:
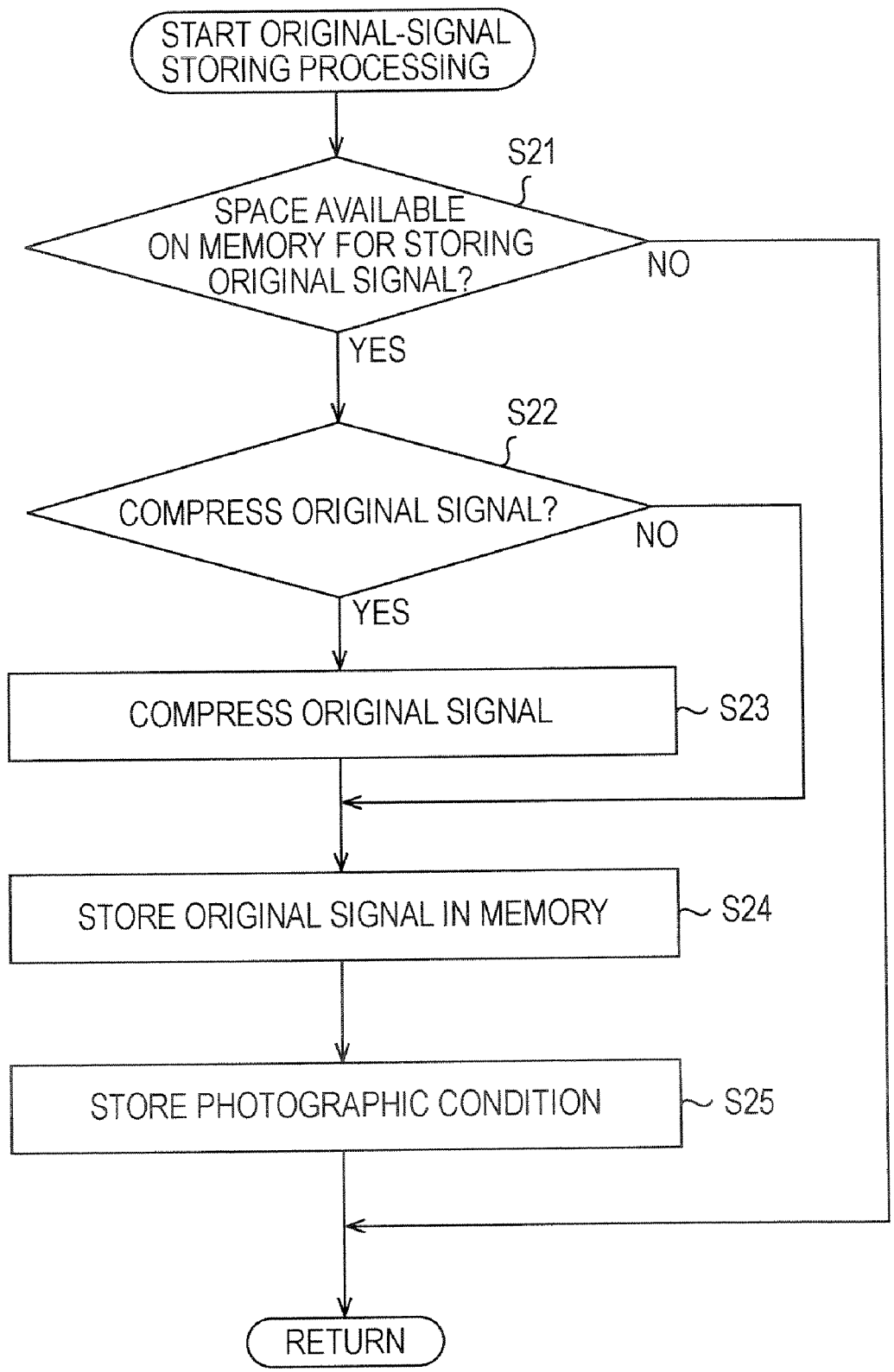
FIG. 15 is a flowchart showing an original signal storing process performed in step S5 shown in FIG. 13.

The original signal storing process performed in step S5 shown in FIG. 13 will be described with reference to the flowchart shown in FIG. 15.

In step S21, the system control circuit 81 determines whether or not there is a space available on the memory 74 for storing the original signal. If it is determined that there is no space available, the system control circuit 81 displays on the display 62, for example, a message informing that the user is no longer permitted to shoot still images, and terminates the processing. Then, the process returns to step S5 shown in FIG. 13, and the subsequent processing is performed.

If it is determined in step S21 that there is a space available on the memory 74 for storing the original signal, then, in step S22, the system control circuit 81 determines whether or not the original signal is to be compressed.

If it is determined in step S22 that the original signal is to be compressed, then, in step S23, the system control circuit 81 controls the switch 71 to be closed, and connects the switch 72 to the terminal b. Thus, the original signal compressed by the original signal compression processing circuit 75 is supplied to the memory 74.

If it is determined in step S22 that the original signal is not to be compressed, the system control circuit 81 controls the switch 71 to be closed while connecting the switch 72 to the terminal a, and skips step S23. Thus, the uncompressed original signal output from the image pickup unit 12 is directly supplied to the memory 74.

In step S24, the system control circuit 81 controls the memory interface 73 to store the original signal (compressed or uncompressed original signal) in the memory 74. Thus, the original signal is recorded in any of the areas $B_1$ to $B_3$ formed in the memory 74.

In step S25, the system control circuit 81 stores the photographic conditions of the moving picture in the memory 82. For example, the system control circuit 81 stores conditions of the capturing of the moving picture that is started in step S2 shown in FIG. 13 and that is still in progress, such as an aperture value and a zoom position, in the memory 82 in unique association with the original signal stored in step S24. Then, the process returns to step S5 shown in FIG. 13, and the subsequent processing is performed.

The still-image recording process performed in step S9 shown in FIG. 13 will be described with reference to the flowchart shown in FIG. 16.

In step S41, the system control circuit 81 reads the stored photographic conditions from the memory 82, and sets the still-image processing parameters determined by referring to the read photographic conditions in the respective components of the image processing unit 13. Since the capturing of the moving picture has been completed at this time, the processing to be performed by the image processing unit 13 can be switched to processing specific to still images.

In step S42, the system control circuit 81 determines whether or not the original signal recorded in the memory 74 is a compressed signal. If it is determined that the original signal is a compressed signal, the process proceeds to step S43.

In step S43, the system control circuit 81 connects the switch 72 to the terminal b to supply the original signal recorded in the memory 74 to the original signal compression processing circuit 75 to decompress the compressed original signal.

If it is determined in step S42 that the original signal recorded in the memory 74 is not a compressed signal, the system control circuit 81 skips step S43, and proceeds to step S44.

In step S44, the system control circuit 81 reads the original signal recorded in the memory 74, and supplies the read original signal to the image processing unit 13. Thus, the uncompressed original signal recorded in the memory 74 is supplied to the image processing unit 13 through the switches 72 and 71. Alternatively, the compressed original signal that has been decompressed (expanded) by the original signal compression processing circuit 75 is supplied to the image processing unit 13 through the switch 71.

In step S45, the system control circuit 81 controls the respective components of the image processing unit 13 to perform the still-image processing on the temporarily recorded original signal.

In step S46, the system control circuit 81 controls the still-image compression circuit 52 to encode the still image. The encoded still-image data generated by the still-image compression circuit 52 is supplied to and temporarily recorded in the memory 74 through the memory interface 73.

In step S47, the system control circuit 81 determines whether or not all the still images have been processed. If it is determined that all the still images have not been processed, the process returns to step S41, and the subsequent processing is repeatedly performed.

If it is determined in step S47 that all the still images have been processed, then, in step S48, the system control circuit 81 transfers the encoded still-image data recorded in the memory 74 to the recording medium B for recording. Thus, all the still images generated based on the original signals are simultaneously recorded on the recording medium B. For example, after the original signals recorded in the memory 74 are deleted, the processing subsequent to the processing of step S9 shown in FIG. 13 is performed.

In a case where a DVD serving as the recording medium A is selected as the still-image recording destination, all the still images generated based on the original signals are simultaneously transferred to and recorded on the recording medium A.

Figure 17:
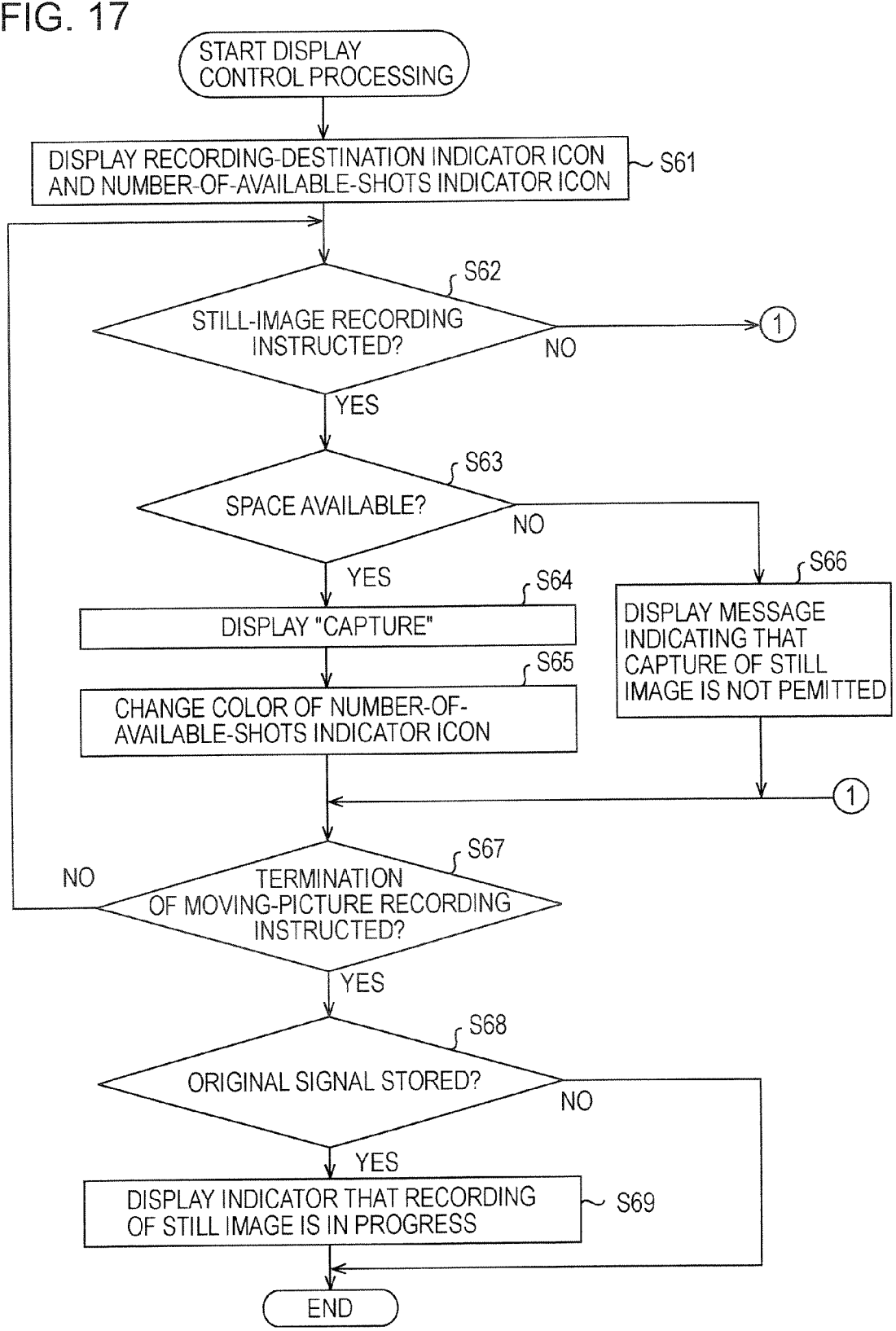
FIG. 17 is a flowchart showing a display control process.

A process for the photographing apparatus 1 to control the display of the display 62 will be described with reference to a flowchart shown in FIG. 17. The process is performed in parallel to the above-described processes when the moving-picture capturing operation starts (when it is determined in step S1 shown in FIG. 13 that the user has given an instruction to start recording of a moving picture). In the standby mode until the capturing of the moving picture has been started, a captured image is displayed on the display 62.

In step S61, the system control circuit 81 controls the display control circuit 61 to display a captured image on the basis of the data supplied from the resolution conversion circuit 33 and to display the recording-destination indicator icon 101 and the number-of-available-shots indicator icons 102 side-by-side on the display 62 so as to be superimposed on the captured image. That is, the screen shown in the leftmost column of FIG. 8 is displayed.

In step S62, the system control circuit 81 determines whether or not an instruction for recording a still image has been given (that is, whether or not an instruction for half-pressing and then fully pressing the still-image recording button has been given). If it is determined that the instruction has been given, then, in step S63, the system control circuit 81 determines whether or not there is a space available on the memory 74 for storing the original signal.

If it is determined in step S63 that there is a space available, then, in step S64, the system control circuit 81 displays character "CAPTURE" above the recording-destination indicator icon 101 and the number-of-available-shots indicator icons 102. At this time, the process shown in FIG. 15 in which the original signal is saved in the memory 74 is performed.

When the original signal has been saved, then, in step S65, the system control circuit 81 displays one of the number-of-available-shots indicator icons 102 in a different color. Then, the process proceeds to step S67.

If it is determined in step S62 that an instruction for recording a still image has not been given, or if it is determined in step S63 that there is no space available and after an message informing that the user is no longer permitted to shoot still images, e.g., the message 131 shown in FIG. 11, is displayed in step S66, the system control circuit 81 proceeds to step S67, and performs the subsequent processing.

In step S67, the system control circuit 81 determines whether or not the user has given an instruction to end the recording of the moving picture. If it is determined that the instruction has not been given, the process returns to step S62, and the operation described above is repeatedly performed. The screen shown in the leftmost column of FIG. 8 is continuously displayed on the display 62.

If it is determined in step S67 that the user has given an instruction to end the recording of the moving picture, then, in step S68, the system control circuit 81 determines whether or not the original signal is stored in the memory 74.

If it is determined in step S68 that the original signal is stored in the memory 74, then, in step S69, the system control circuit 81 displays the indicator 103 adjacent to the recording-destination indicator icon 101. The system control circuit 81 further displays the message 114 (see FIG. 9) indicating that the still-image processing is in progress at the center of the screen.

Figure 16:
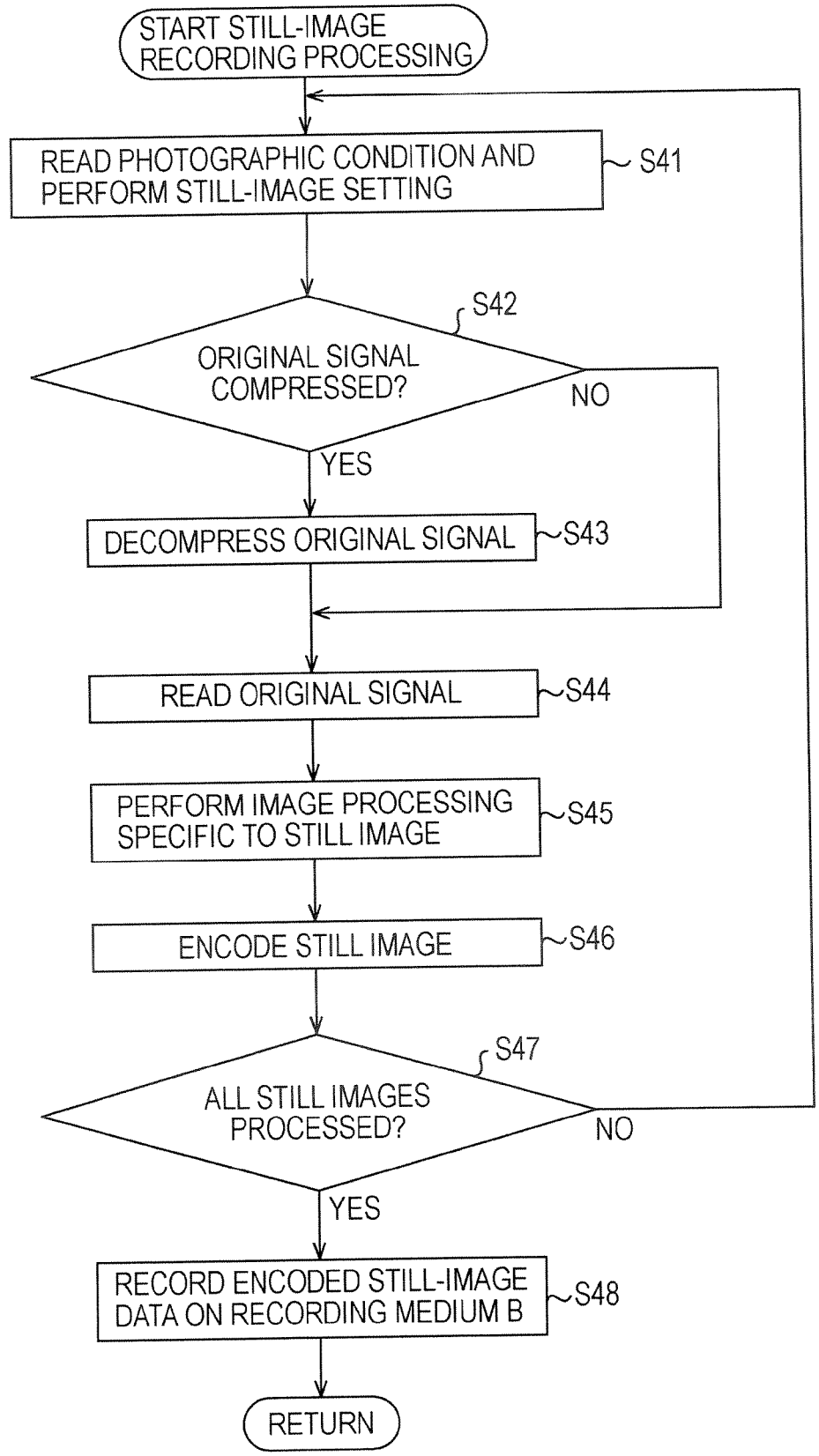
FIG. 16 is a flowchart showing a still-image recording process performed in step S9 shown in FIG. 13.

At this time, the process shown in FIG. 16 in which a still image is generated based on the original signal stored in the memory 74 and is recorded on the recording medium B or the like is performed. During the process, the generated still images are sequentially displayed, and the display of the indicator 103 described above with reference to FIG. 7 is repeatedly performed. After the still images have been recorded, the captured image shown in the right column of FIG. 9 is displayed on the display 62.

Also if it is determined in step S68 that the original signal is not recorded, the captured image shown in the right column of FIG. 9 is displayed on the display 62.

By performing the process described above, during the capturing of a moving picture, the user can intuitively understand that image data for generating a still image is saved and that the still image is recorded on the basis of the saved image data.

In the foregoing description, when an original signal is saved, photographic conditions are recorded in the memory 82, which is different from the memory 74 in which the original signal is recorded. The original signal and the photographic conditions may be recorded in the memory 74.

Instead of the photographic conditions described above, various information that can be used to determine still-image processing parameters may be recorded as the photographic conditions to be recorded.

In the foregoing description, the user gives an instruction to end capturing of a moving picture, and the still-image processing is performed at a timing at which the moving-picture processing is stopped in response to the instruction. For example, the still-image processing may be performed at any timing at which the image processing unit 13 does not perform the moving-picture processing, such as a timing at which the capturing of the moving picture is paused.

In the foregoing description, the memory 74 can store original signals corresponding to three still images. The number of still images is not limited to three, but original signals corresponding to more still images may be stored if the capacity is sufficiently large. In this case, the user can shoot four or more still images during a single moving-picture capturing operation.

The series of processes described above may be executed by hardware or software. When the series of processes are executed by software, programs constituting the software are installed from a program recording medium onto a computer included in special hardware or an apparatus capable of executing various functions with various programs installed thereon, such as a general-purpose personal computer.

Figure 18:
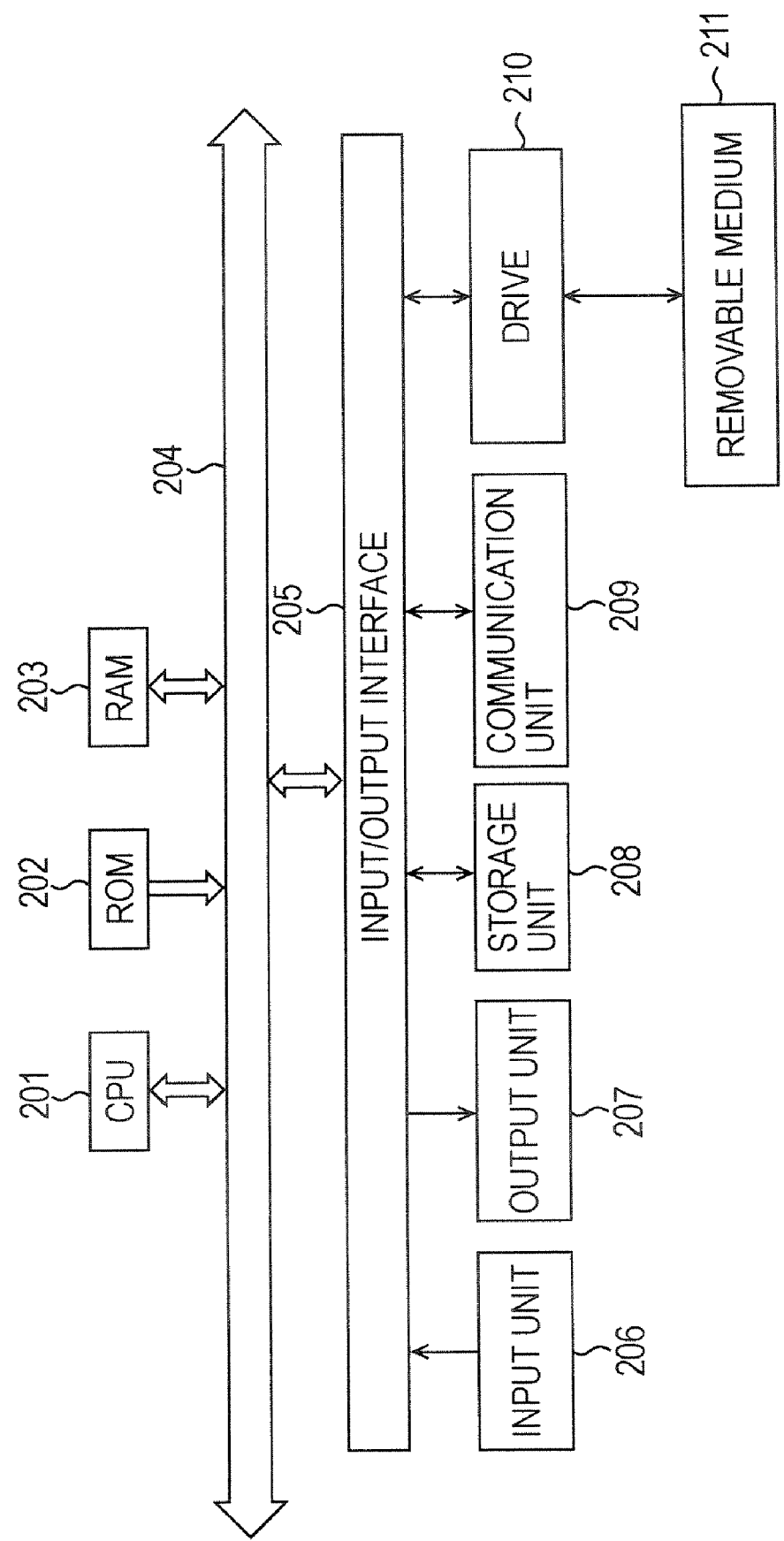
FIG. 18 is a block diagram showing an example structure of a personal computer.

FIG. 18 is a block diagram showing an example structure of a personal computer that executes the series of processes described above according to a program. A central processing unit (CPU) 201 executes various processes according to programs stored in a read only memory (ROM) 202 or a storage unit 208. A RAM 203 stores the programs executed by the CPU 201, data, etc., if necessary. The CPU 201, the ROM 202, and the RAM 203 are connected to each other through a bus 204.

The CPU 201 is also connected to an input/output interface 205 through the bus 204. The input/output interface 205 is connected to an input unit 206 including a keyboard, a mouse, and a microphone, and an output unit 207 including a display and a speaker. The CPU 201 executes various processes according to instructions input from the input unit 206. The CPU 201 outputs a processing result to the output unit 207.

The storage unit 208 connected to the input/output interface 205 is formed of, for example, a hard disk, and stores the programs executed by the CPU 201 and various data. A communication unit 209 communicates with an external apparatus via a network such as the Internet or a local area network.

A drive 210 connected to the input/output interface 205 drives a removable medium 211, such as a magnetic disk, an optical disk, a magneto-optical disk, or a semiconductor memory, when the removable medium 211 is inserted, to obtain the programs and data recorded thereon. The obtained programs and data are transferred to and stored in the storage unit 208, if necessary.

The program recording medium that stores a program installed onto the computer and enabled by the computer may be, as shown in FIG. 18, the removable medium 211 as a packaged medium, such as a magnetic disk (including a flexible disk), an optical disk (including a compact disc-read only memory (CD-ROM) and a DVD), a magneto-optical disk, or a semiconductor memory, or a medium that temporarily or permanently stores the program, such as the ROM 202 or a hard disk constituting the storage unit 208. The program is stored in the program recording medium through the communication unit 209 serving as an interface such as a router or a modem, if necessary, using a wired or wireless communication medium such as a local area network, the Internet, or digital satellite broadcasting.

In this specification, steps defining the program recorded on the program recording medium may include processes that are executed sequentially in the orders described, and also include processes that are executed in parallel or individually, not necessarily sequentially.

It should be understood by those skilled in the art that various modifications, combinations, sub-combinations and alterations may occur depending on design requirements and other factors insofar as they are within the scope of the appended claims or the equivalents thereof.

What is claimed is:

1. A photographing apparatus for capturing a still image during a capturing of a moving picture, in which image data obtained when an instruction for capturing the still image is issued during the capturing of the moving picture is saved in a first recording medium, and the still image is generated based on the image data saved in the first recording medium and is recorded on a second recording medium different from the first recording medium when the capturing of the moving picture has been completed, the photographing apparatus comprising:

a memory; and display control means for displaying a first icon and an indicator side-by-side during the capturing of the moving picture, the first icon indicating the second recording medium that is a recording destination of the still image and the indicator indicating the number of still images for which image data can be saved in the first recording medium, and for displaying an indicator indicating that the still image generated based on the image data saved in the first recording medium is currently recorded on the second recording medium when the capturing of the moving picture has been completed.

2. The photographing apparatus according to claim 1, wherein:

the indicator indicating the number of still images for which image data can be saved in the first recording medium includes at least one second icon, the number of the at least one second icon corresponding to the number of still images; and the display control means displays the at least one second icon in a different color each time the image data is saved in the first recording medium in response to the instruction for capturing the still image.

3. The photographing apparatus according to claim 1, wherein for a period during which the still image generated based on the image data saved in the first recording medium is recorded on the second recording medium, the display control means further displays the generated still image.

4. The photographing apparatus according to claim 3, wherein for a period during which a plurality of still images generated based on the image data saved in the first recording medium are recorded on the second recording medium, the display control means sequentially displays the generated still images.

5. A display control method for a photographing apparatus for capturing a still image during a capturing of a moving picture, in which image data obtained when an instruction for capturing the still image is issued during the capturing of the moving picture is saved in a first recording medium, and the still image is generated based on the image data saved in the first recording medium and is recorded on a second recording medium different from the first recording medium when the capturing of the moving picture has been completed, the display control method comprising:

displaying, at the photographing apparatus, a first icon and an indicator side-by-side during the capturing of the moving picture, the first icon indicating the second recording medium that is a recording destination of the still image and the indicator indicating the number of still images for which image data can be saved in the first recording medium; and displaying, at the photographing apparatus, an indicator indicating that the still image generated based on the image data saved in the first recording medium is currently recorded on the second recording medium when the capturing of the moving picture has been completed.

6. A tangible, computer-readable recording medium storing a program for allowing, upon an execution of the program, a computer to execute a display control method for a photographing apparatus for capturing a still image during a capturing of a moving picture, in which image data obtained when an instruction for capturing the still image is issued during the capturing of the moving picture is saved in a first recording medium, and the still image is generated based on the image data saved in the first recording medium and is recorded on a second recording medium different from the first recording medium when the capturing of the moving picture has been completed, the display control method comprising:

displaying a first icon and an indicator side-by-side during the capturing of the moving picture, the first icon indicating the second recording medium that is a recording destination of the still image and the indicator indicating the number of still images for which image data can be saved in the first recording medium; and displaying an indicator indicating that the still image generated based on the image data saved in the first recording medium is currently recorded on the second recording medium when the capturing of the moving picture has been completed.

7. A photographing apparatus for capturing a still image during a capturing of a moving picture, in which image data obtained when an instruction for capturing the still image is issued during the capturing of the moving picture is saved in a first recording medium, and the still image is generated based on the image data saved in the first recording medium and is recorded on a second recording medium different from the first recording medium when the capturing of the moving picture has been completed, the photographing apparatus comprising:

a display control unit configured to display a first icon and an indicator side-by-side during the capturing of the moving picture, the first icon indicating the second recording medium that is a recording destination of the still image and the indicator indicating the number of still images for which image data can be saved in the first recording medium, and to display an indicator indicating that the still image generated based on the image data saved in the first recording medium is currently recorded on the second recording medium when the capturing of the moving picture has been completed.

\* \* \* \* \*